July 9, 1968　　　　E. M. WEISS ET AL　　　　3,392,241
AUTOMATIC PHYSIOLOGICAL TESTING APPARATUS
Filed Oct. 20, 1964　　　　　　　　　　　　11 Sheets-Sheet 1

INVENTOR
ERWIN M. WEISS
RICHARD BRANDER
BY
Bair, Freeman & Molinare
Attys.

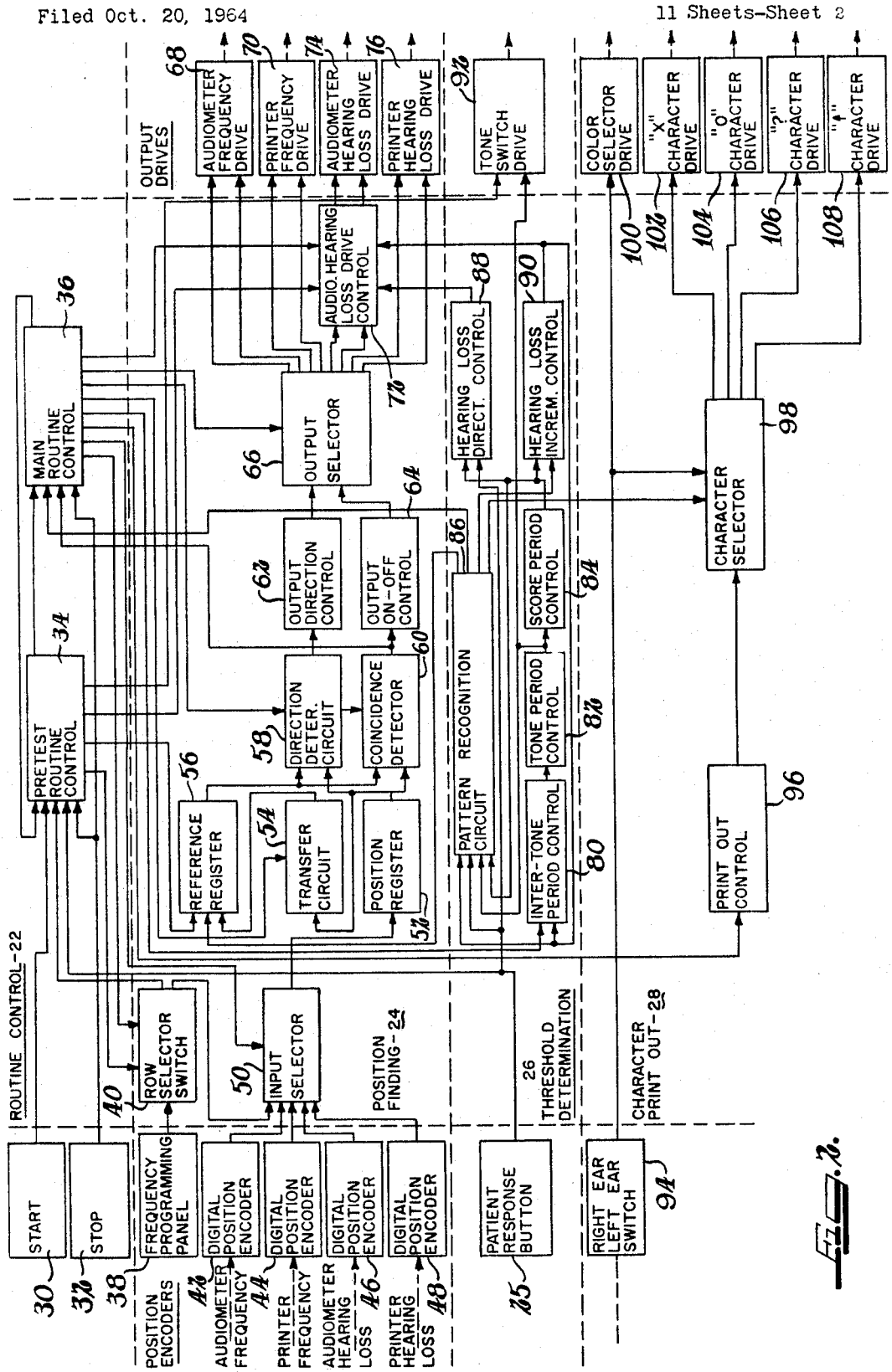

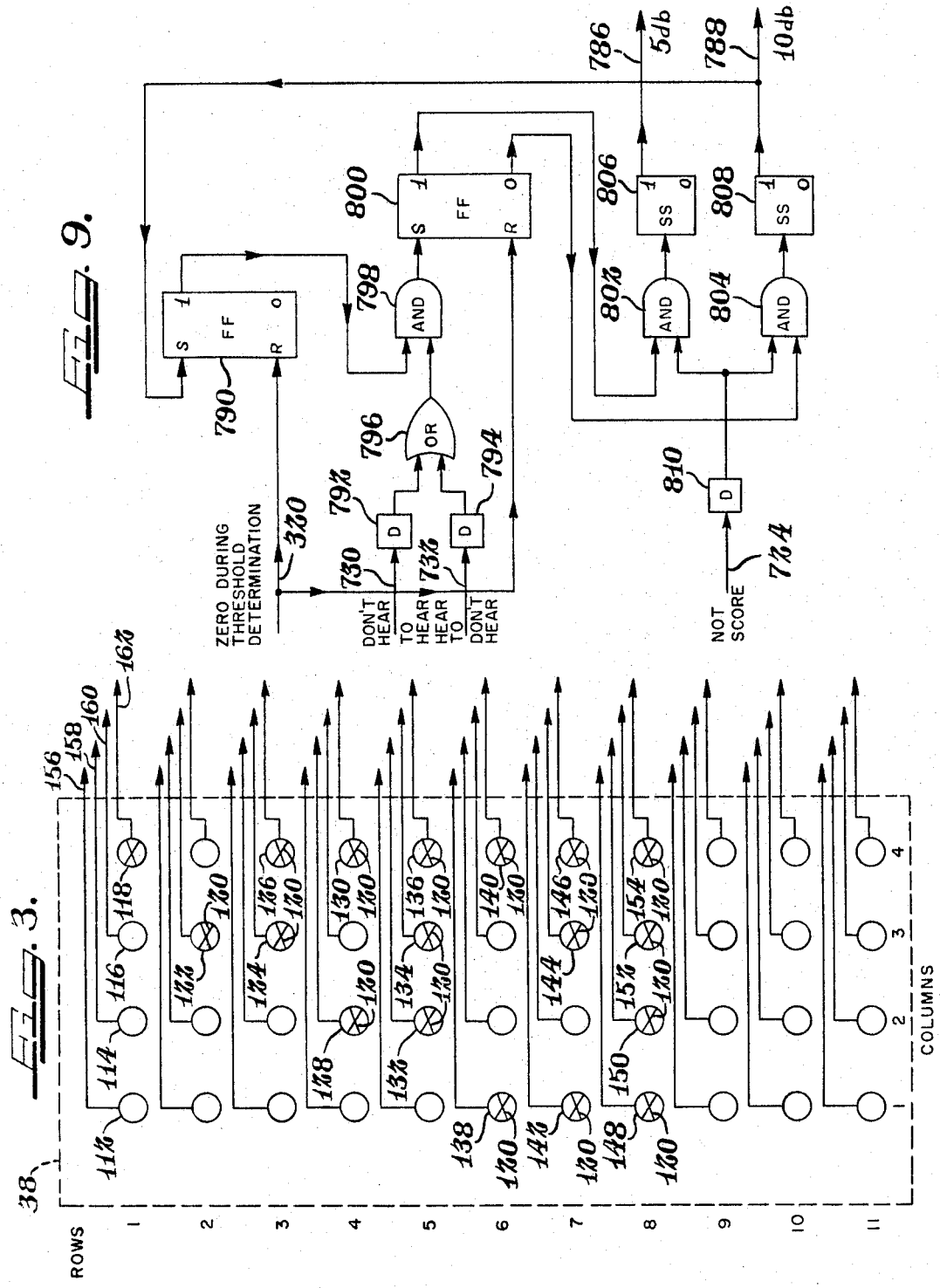

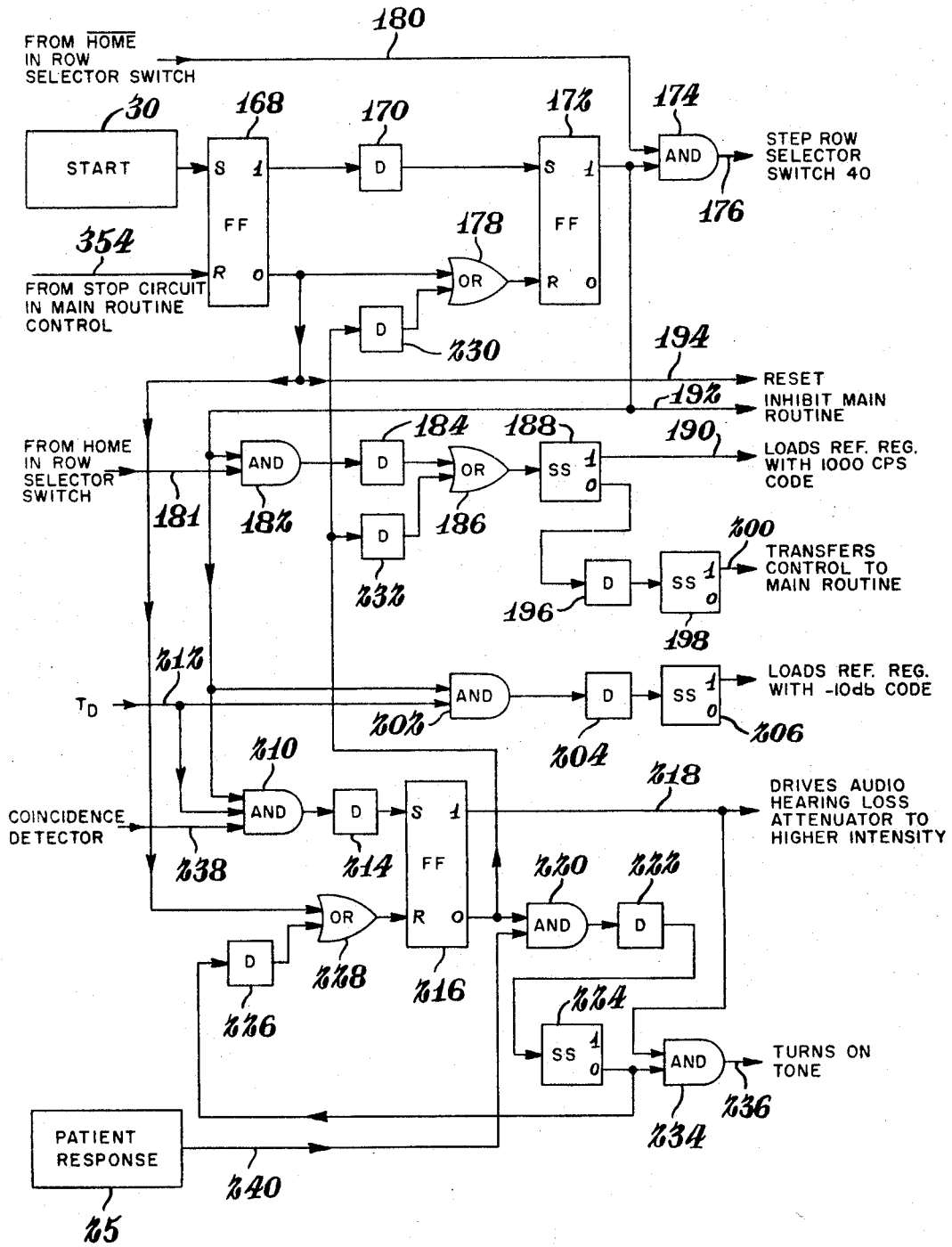

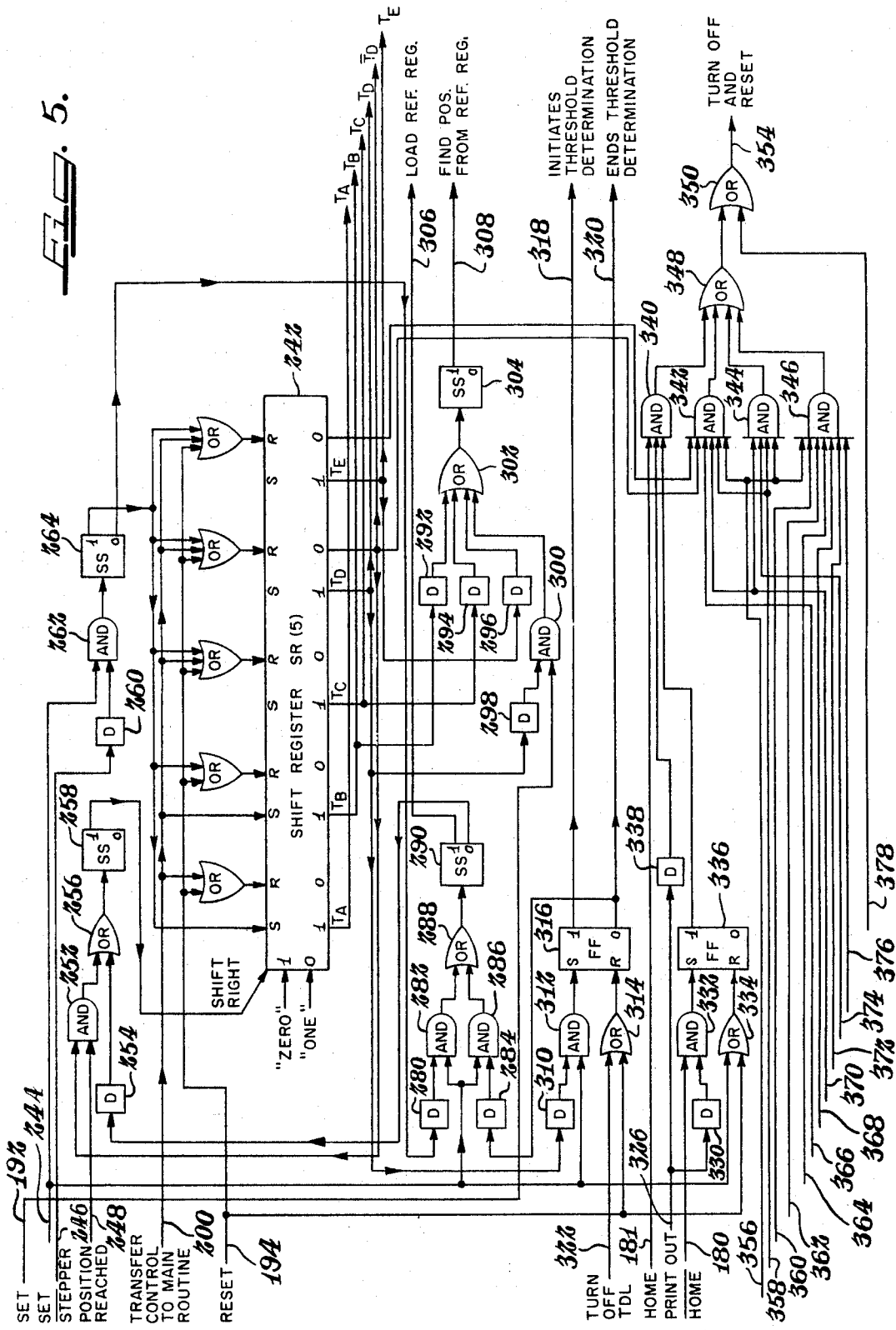

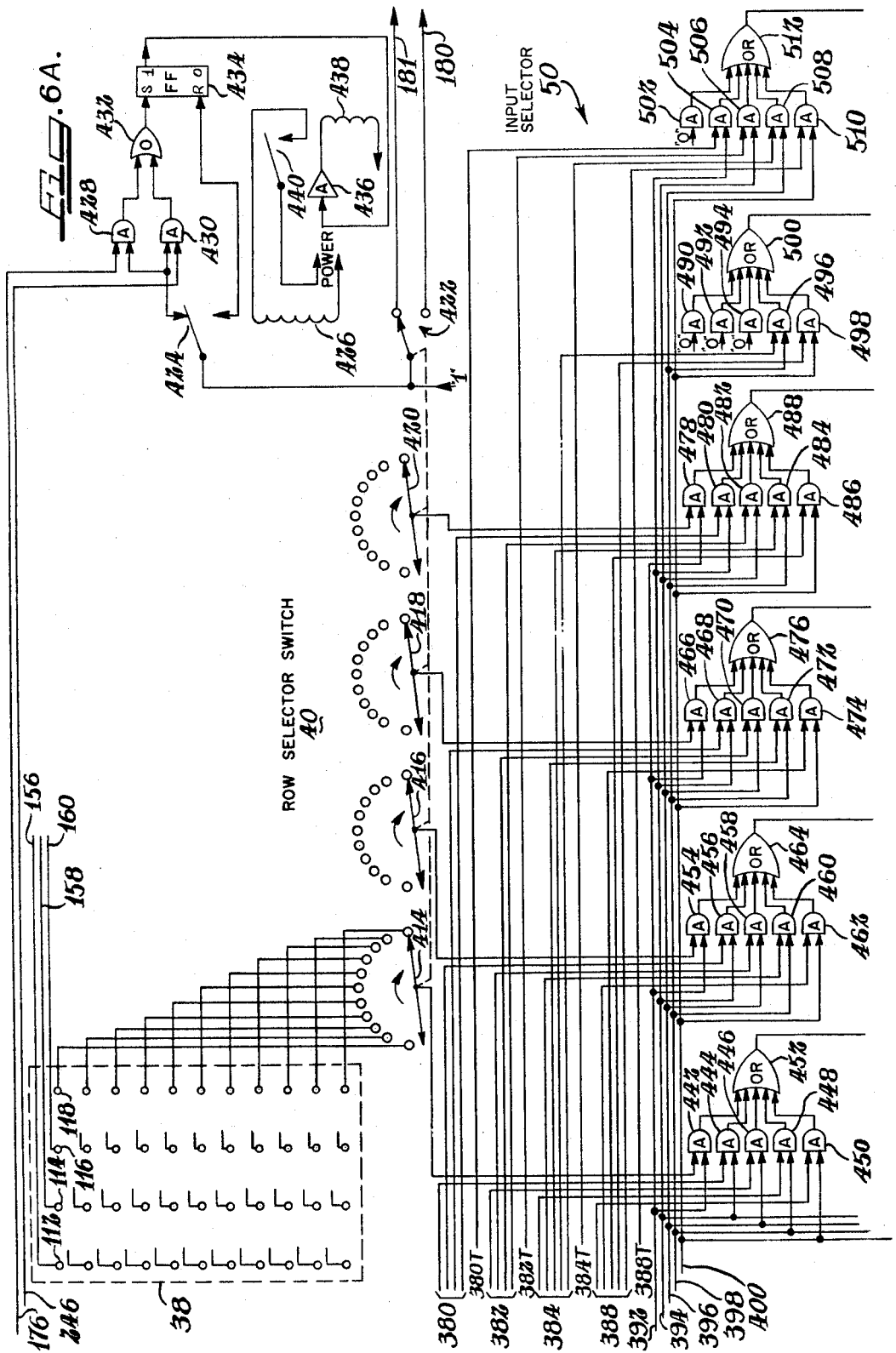

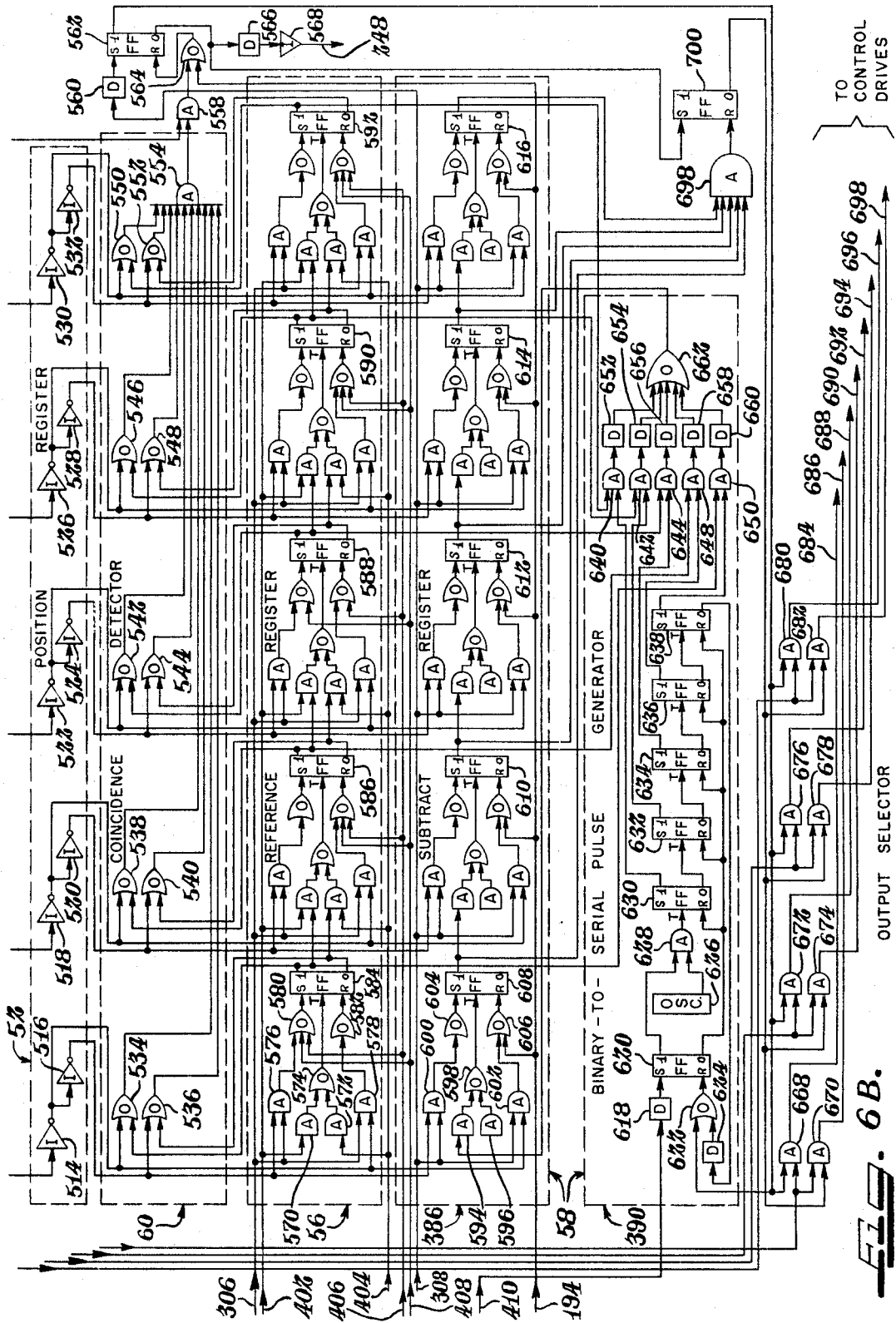

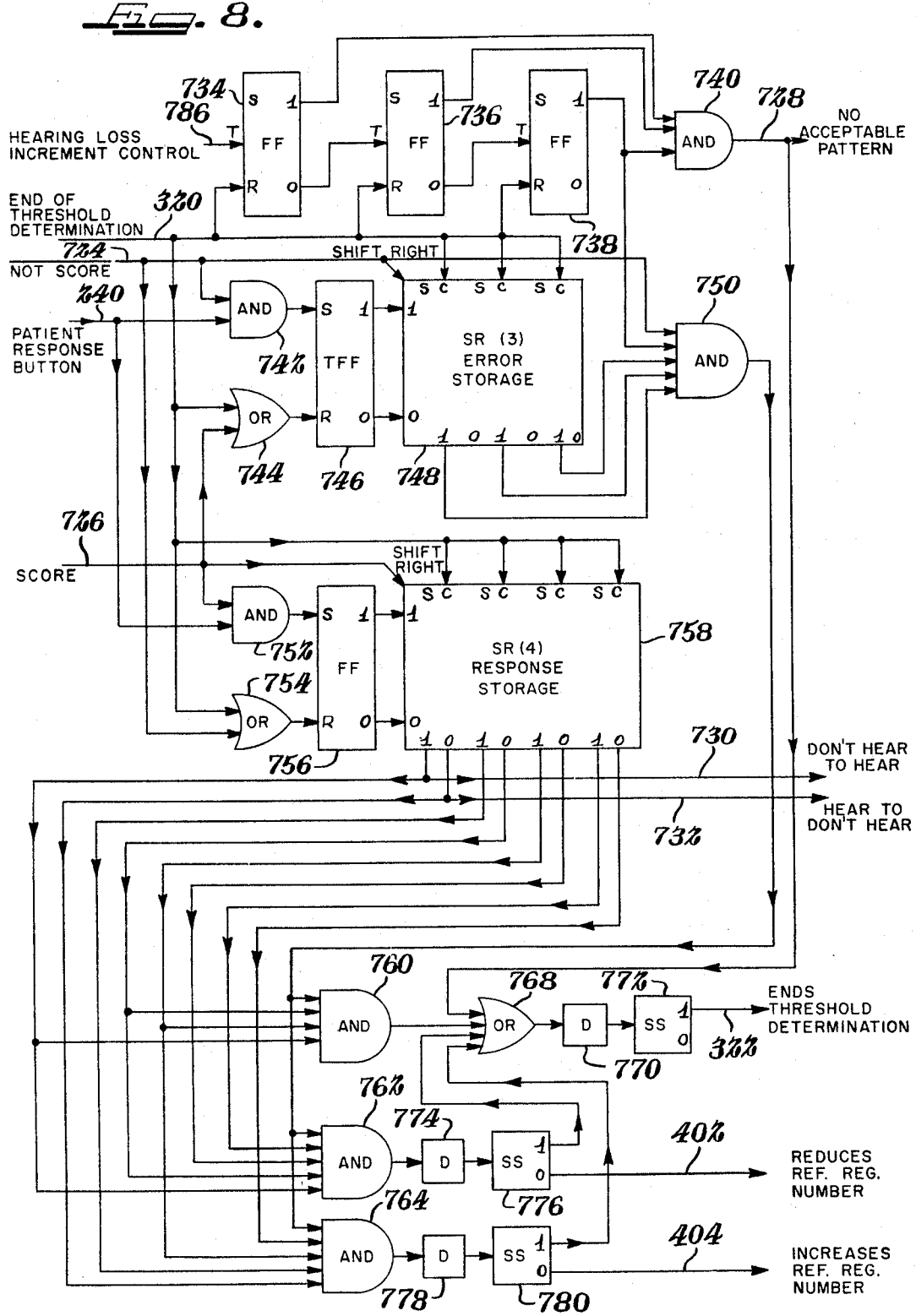

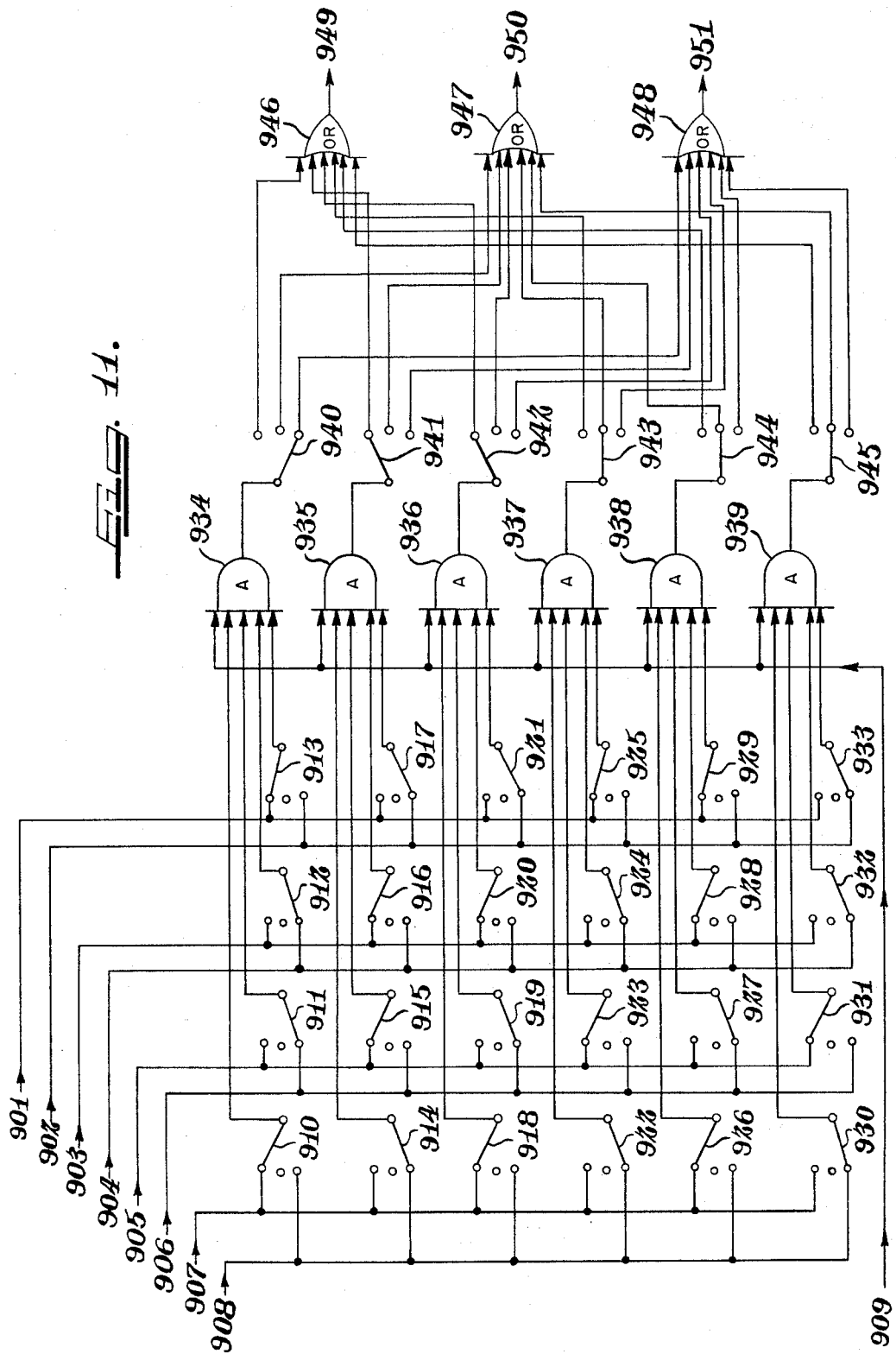

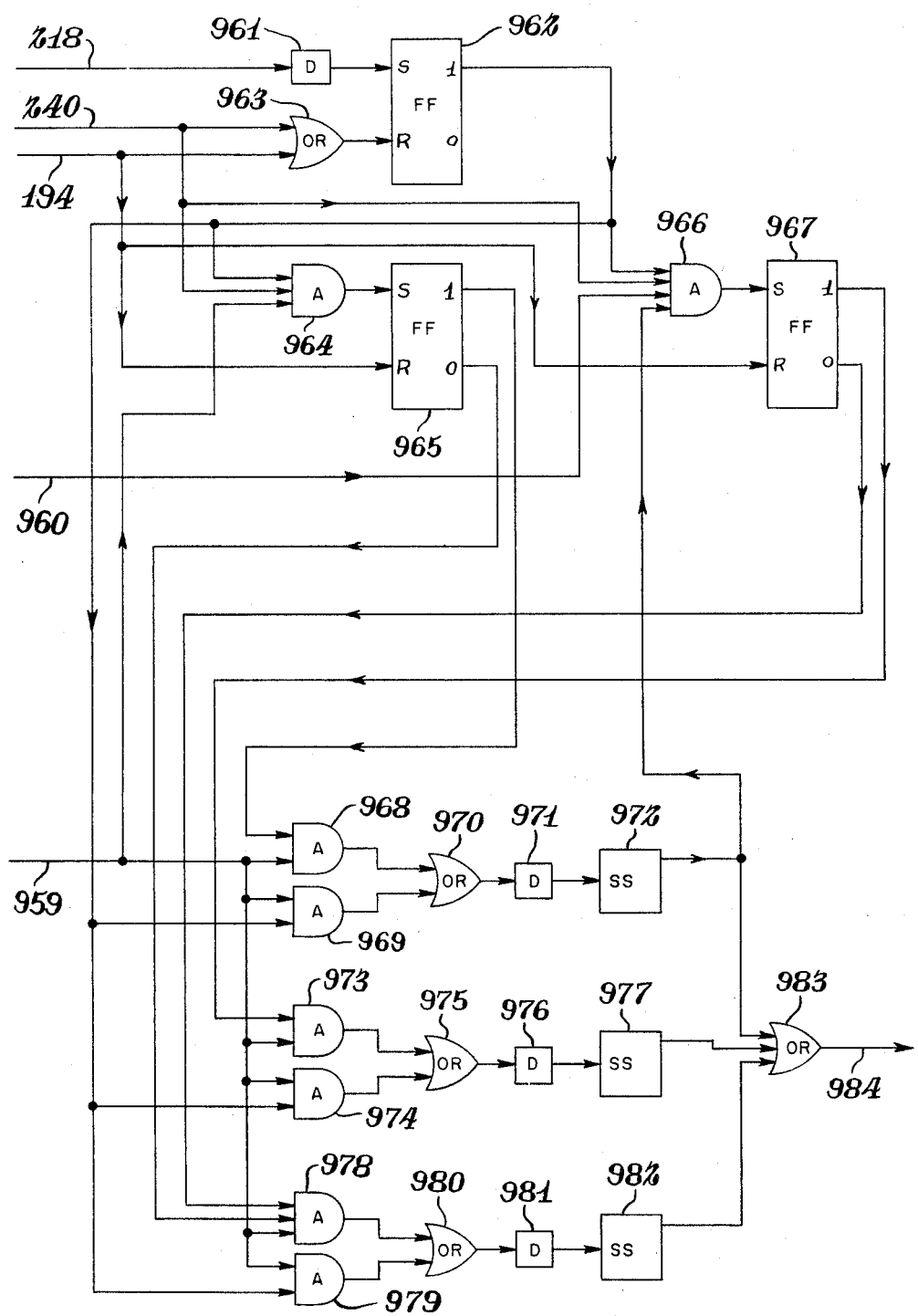

United States Patent Office 3,392,241
Patented July 9, 1968

3,392,241
AUTOMATIC PHYSIOLOGICAL TESTING
APPARATUS
Erwin M. Weiss, Chicago, and Richard Brander, Cicero, Ill., assignors to Beltone Electronics Corporation, a corporation of Illinois
Filed Oct. 20, 1964, Ser. No. 405,150
26 Claims. (Cl. 179—1)

ABSTRACT OF THE DISCLOSURE

In a testing apparatus, a patient's response to a series of stimuli of varying intensity is compared with preselected patterns of response and used to automatically change the settings of the apparatus.

This invention relates generally to physiological testing apparatus, and more particularly to a new and improved type of such apparatus which in one preferred embodiment takes the form of a computing automatic audiometer for testing and indicating hearing loss.

Standard audiometric procedures have been known and utilized for many years whereby an audiologist manually determines the order, number of frequencies and intensities of the tones at which he wishes to test the subject. A trained audiologist is capable of evaluating the subject's responses, in accordance with the audiometric procedures outlined, for example, in the textbook on Audiology by Hayes Newby, to prepare an audiogram of the subject's hearing loss characteristics.

It is well known that the responses of a subject to tones near the threshold of hearing are not definite, but exhibit a statistical variability. For tones well above threshold, the subject will respond each time a tone is presented, but at decreasing intensities the subject will become less certain in his responses, will not respond each time a tone is presented, and may even respond when no tone is presented. The central problem in audiometry is to derive a fast and accurate estimate of a subject's hearing threshold from his responses to applied stimuli when these responses exhibit this type of variability.

Manual audiometric procedures have been known and used for many years in which an audiologist applies a series of tones at various intensities to a subject and deduces the subject's hearing threshold from his responses to these tones. Such procedures usually specify a sequence of changes of tone intensities which are based on the subject's previous response, and also specify the rationale for deriving the subject's hearing threshold from his pattern of responses. An example of such an audiometric procedure can be found in the textbook, "Audiology" by Hayes Newby.

The techniques used in audiometry can also be used in other types of physiological tests, for example, tests for threshold of feeling, tests for state of alertness, and tests for time discrimination. Such tests are also characterized by subject response variability and can use the same method of applying to a subject a series of stimuli in which one stimulus parameter is varied and of examining his sequence of response and performing data reduction to derive a value representing one aspect of the subject's physiological condition.

In all such tests, it is possible and often desirable to perform such an evaluation for a number of different values of a second stimulus parameter. For example, in audiometry it is desirable to evaluate hearing theshold at a number of different frequencies.

It is a general object of this invention to provide novel physiological testing apparatus which automatically derives a single value representing one aspect of a subject's physiological condition by examining his sequence of responses to a series of applied stimuli in which the appropriate parameter is varied.

It is one specific object of this invention to provide one such physiological testing apparatus in the embodiment of an audiometer which automatically derives a single value representing a subject's hearing threshold by examining his sequence of responses to a series of audio signals at various intensity levels.

It is one specific object of this invention to provide one such physiological testing apparatus in the embodiment of an automatic audiometer having pattern detector means for evaluating the response of a subject to the presentation of various tones and for indicating when an acceptable response pattern has occurred from which the subject's threshold may be determined.

It is another object of this invention to provide such physiological testing apparatus, as above, which further incorporates novel means for externally programming the acceptable response patterns to be recognized by the apparatus.

It is another object of this invention to provide a novel automatic physiological testing apparatus, as above, which incorporates selective external programming of both the number of different frequencies and the order in which they are presented to the subject under test.

It is still another object of this invention to provide a novel automatic audiometer having means for providing a pretest period for familiarization, approach and an initial threshold determination at a preselected test frequency.

It is a further object of this invention to provide such an automatic audiometer, as above, having the feature of a test-retest reliability check such that the subject's threshold at a preselected frequency can be examined twice—once during the pretest period and once during the regular test period.

It is still another object of this invention to provide such an automatic audiometer having novel means for enabling the time period during which the patient's response to a presented tone is considered as valid (score period) to be adjusted automatically and in a manner based on the subject's reaction time during the pretest operation.

It is a still further object of this invention to provide a novel automatic audiometer which incorporates automatic adjustment of the frequency controls and automatic variation of the hearing loss attenuation increment between the frequency tone presentations to the subject to approach threshold rapidly using large increments and to determine threshold accurately using smaller increments.

It is a still further object of this invention to provide such a new and improved computing automatic audiometer which is characterized by its programmed operation which minimizes operator activity, by its flexiblity in the selection of the order and number of frequency tones presented to the subject, and by its ability to derive a value for bearing threshold based upon a reasoning process programmed into the apparatus, which is derived from recognized audiometric rationale and procedures.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 2 is a block diagram illustrating the overall circuit arrangement of one illustrative embodiment of a computing automatic aduiometer incorporating the principles of the invention;

FIGURE 3 illustrates the frequency programming panel of the invention which permits the order and number of the frequency tones to be selectively programmed for each hearing loss test;

FIGURE 4 is a logic diagram illustrating the pretest routine control portion of the automatic audiometer;

FIGURE 5 is a logic diagram illustrating the main routine control portion of the automatic audiometer;

FIGURE 6 is a logic diagram illustrating the position finding portion of the automatic audiometer;

FIGURE 8 is a logic diagram illustrating one embodiment of the pattern recognition portion of the automatic audiometer;

FIGURE 9 is a logic diagram of the hearing loss increment control portion of the automatic audiometer;

FIGURE 11 is a logic diagram illustrating one embodiment of pattern detector programming means for enabling the operator to preselect the patterns to be detected automatically by the apparatus; and FIGURE 12 is a logic diagram of one illustrative embodiment of a circuit suitable for varying the score period of the testing apparatus.

GENERAL DESCRIPTION OF THE INVENTION

As the description of this invention proceeds hereinbelow, those skilled in the art will appreciate that the novel principles of the invention relate generally to physiological testing apparatus of various kinds. More particularly, this invention is directed to physiological testing apparatus which advantageously incorporates means for applying a series of stimuli to a subject and having unique pattern detector means adapted to automatically evaluate the responses of the subject to such stimuli and for determining when an acceptable pattern of responses has occurred.

While such novel physiological testing apparatus may take any one of a number of various forms, for the purposes of disclosing the invention herein, it will be illustrated in an automatic audiometer embodiment which utilizes the unique pattern detector means for evaluating the subject's responses to the presentation of various audible tones and determining the occurrence of an acceptable response pattern from which the subject's threshold may be determined.

Figure 1:
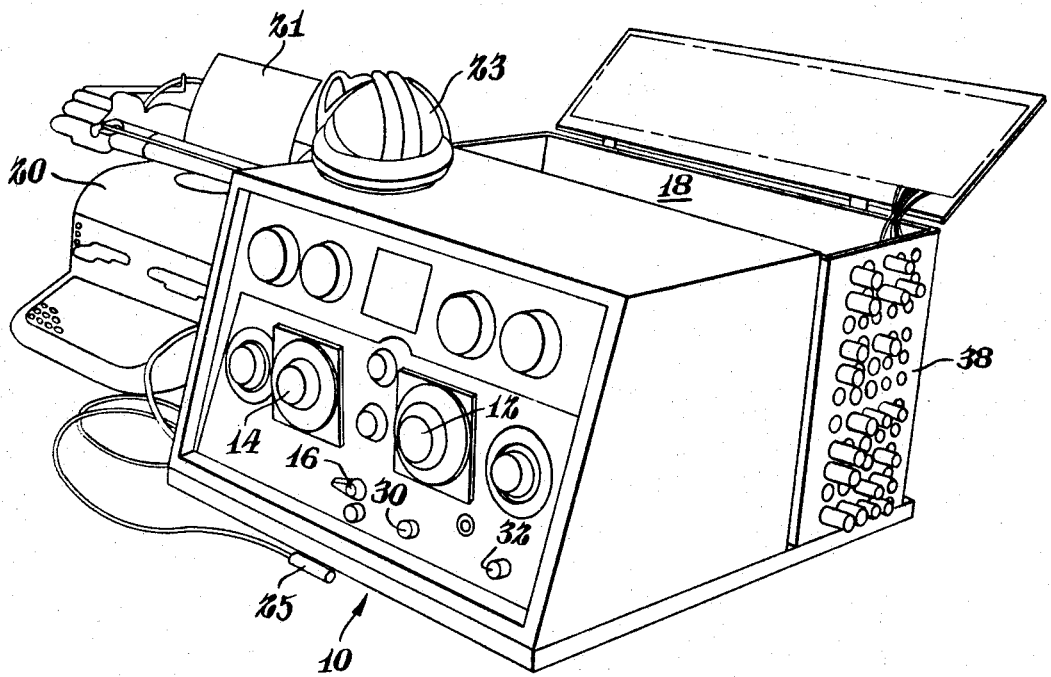
FIGURE 1 is a pictorial view of an automatic audiometer assembly embodying the invention.

Referring now to the drawings, and more particularly to FIGURES 1 and 2 thereof, there is shown in pictorial and block diagram form respectively one such computing automatic audiometer embodying the novel principles of the present invention. In the illustrative form of the invention depicted in FIGURE 1, the invention comprises an audiometer 10, having conventional controls for manual hearing loss testing, such as frequency dial 12, decibel attenuation dial 14, control switch 16, earphones 23, and patient response button 25, to which is operatively connected the computer circuitry 18 and an output recorder such as the typewriter 20 for recording the test results upon an audiogram 21.

The novel automatic audiometer circuitry is shown in block form in FIGURE 2, which depicts the system as comprised of four major portions—routine control 22, position finding 24, threshold determination 26, and character print out 28. While the circuit details and the specific operation of the automatic audiometer are explained fully hereinbelow with respect to the remaining figures of the drawing, the block diagram of FIGURE 2 serves to present the overall principles of the construction and operation of the present invention.

Those skilled in the audiometric arts will appreciate that the human ear is most sensitive to intensity changes at a frequency of one thousand cycles per second and that research has demonstrated that a one thousand cycles per second tone has the highest test-retest reliability of any frequency in the audiometric range. As a result, the instant invention advantageously has been constructed to begin the hearing test at the one thousand cycles per second frequency, with the operator having full programming selectivity of the order and number of the subsequent frequencies at which he wishes to test the subject. However, it also will be appreciated that the apparatus may be constructed to initiate the test at any frequency other than the preferred one thousand cycles per second, if desired.

When a hearing test on the novel automatic audiometer is initiated by the operator, the audiometer frequency dial 12 is automatically rotated to its one thousand cycles per second position and the carriage of typewriter 20 is automatically moved to the one thousand cycles per second position on the audiogram 21. Then with the tone off to the earphones 23, the attenuator dial 14 is automatically rotated counter-clockwise to its lowest intensity position, which advantageously may be the —10 db hearing level.

At this point, a continuous tone is presented to the subject through the earphones and the intensity of the tone is gradually increased at a rate of 5 db per second until the subject operates the patient response button to indicate that the tone is heard. The tone to the earphones then is shut off and its intensity is increased 10 db above the level at which it was first heard. At this point, the novel automatic audiometer apparatus presents the subject with a pulsed tone of one second duration for which the subject's reaction time is determined. On the basis of this determination, the proper score period duration is chosen and this score period is used for the remainder of the tests.

The inventive automatic audiometer continues its operation by presenting the subject with pulsed tones of one second duration each, in 10 db increments, until the subject's response indicates to the apparatus that it has bracketed the subject's threshold by 10 db. As known to those skilled in the art, the term "threshold" as used herein, refers to the lowest level at which the subject responds correctly at least fifty percent of the time, wherein a "correct response" refers to the circumstance when a tone is presented to the subject and the subject indicates that the tone is heard by operation of the response button.

This operation, as described in the preceding paragraph is repeated for each test frequency programmed into the apparatus. At each frequency, the automttic audiometer first changes tone level in 10 db increments. If, during the course of the test, the subject changes his response from "I hear" (operating the response button 25) to "I don't hear," or from "I don't hear to "I hear," this is noted by the audiometer as an indication that it has bracketed the subject's threshold at that frequency and the audiometer changes level in 5 db increments until the subject's threshold has been accurately determined and recorded on the audiogram 21 by the typewriter 20.

In the manner explained in greater detail below, it has been found advantageous to limit the test tones to a maximum of seven 5 db increment tests at any one frequency. Test tones are of one second duration with a score period of two, three or four seconds, starting at the beginning of the tone period. The time interval between tone presentations is a function of the frequency presented and the number of times the tone has already been presented for that frequency. The interval from the time a desired level has been reached by the attenuator or db dial 14 to the time the next tone is presented may be zero, one or two seconds. Thus, the total interval between tones is then zero, one or two seconds plus one, two or three seconds of the score period plus the time required for the attenuator to reach a new level. Accordingly, the total interval between tones is not fixed, but rather is a variable amount such that the subject is unable to predict the time when the next tone pulse will be initiated and thereby give possible false responses based upon guesses rather than actually heard tones.

Formal evaluation by the automatic audiometer of the subject's threshold begins after the apparatus has switched to 5 db attenuation increments. At this point, all of the subject's responses are stored in shift registers, the contents of which are electronically examined for certain predetermined response patterns. Any desired number of acceptable audiometric response patterns which can logically justify a threshold print out by the recorder on the audiogram may be built into the apparatus. Preferably, in one illustrative embodiment of the invention, a maximum of seven tests in 5 db increments are given at any one frequency. If, however, a response pattern is recognized before seven tests, the apparatus prints out the threshold and goes on to the next programmed frequency. The print-out as well as all other outputs, such as the frequency and attenuator dial positions, are controlled by numbers stored in the arithmetic section of the computer circuitry.

Recognition of an acceptable response pattern is effected by means of pattern detector circuitry which monitors the subject's responses, after the audiometer has gone into 5 db increments, to determine if the subject's threshold has been found. When a proper pattern is recognized, a reference register is set to the number corresponding to the final setting of the attenuator. This final setting may not correspond to the patient's threshold and if such is the case, the pattern detector modifies the number in the register accordingly.

Thus, the present invention incorporates apparatus capable of making decisions based upon the audiometric rationale and reasoning process built into the apparatus. An additional feature of the invention is its ability to detect the subject's errors resulting from nervousness, tinnitus, or failure to understand the instructions.

Referring now ot the block diagram of FIGURE 2, blocks 30, 32, 34 and 36 are associated with the function of routine control. The start button 30 is actuated by the operator to initiate the sequence of events determined by the pretest routine control 34. As explained in greater detail hereinbelow, the pretest routine control 34 brings the audiometer to its starting position and makes an initial theshold approach at one thousand cycles per second. The main routine control 36 then takes over the control of the audiometer and determines the sequence of events for the remainder of the test. The stop button 32, when actuated, stops and resets the audiometer at any point in the routine.

The position finding portion 24 of the automatic audiometer contains the blocks associated with the function of controlling the position of the audiometer frequency dial and hearing loss attenuator dial, as well as the positions at which the recorder or typewriter prints out on the audiogram card. The number and order of frequency presentations are selectively programmed into the frequency programming panel 38. Advantageously, this is accomplished by the operator placing plugs into the plugboard rows in the desired positions. The row selector switch 40 selects, one row at a time, the frequency codes programmed into the various rows of the frequency programming panel. The input selector 50 sequentially selects the outputs of the row selector switch 40 and the four digital positions encoders 42, 44, 46 and 48. Each of these encoders advantageously comprises a coded disc which provides a digital output corresponding to the position of a component to be controlled.

Thus, the digital position encoder 42 provides a digital output corresponding to the position of the audiometer frequency dial, the encoder 44 provides a digital output corresponding to the position of the recorder frequency printer, the encoder 46 provides a digital output corresponding to the posiiton of the audiometer hearing loss dial, and the encoder 48 provides a digital output corresponding to the position of the recorder hearing loss printer. At the same time, and in synchronism with the input selector operation, the output selector 66 selects the desired one of the four output drives, namely, the audiometer frequency dial drive 68, the printer freqency drive 70, the audiometer hearing loss dial drive 74 (through the audiometer hearing loss drive control 72), and the printer hearing loss drive 76.

Each output drive, together with its corresponding position encoder, is mechanically connected to the proper mechanism in the printer or audiometer to thereby control the position of such mechanism. The four mechanisms so controlled are the audiometer frequency selector dial 12, the printer frequency axis positioning mechanism or typewriter carriage 20, the audiometer hearing loss attenuator dial 14, and the printer hearing loss axis positioning mechanism for controlling the rotation of the printer carriage roller. The position of each of these mechanisms and the energization of its drive to place it in a desired position is sensed and controlled by the position finding circuitry 24 of the audiometer.

Towards this end, the position register 52 is connected to the output of the input selector 50, and thus stores the coded digits indicating the position of the selected input transferred to the position register 52 by the input selector 50. Thus, the audiometer frequency dial position may be stored in the position register 52 when the input selector 50 is operatively connected to the position encoder 42. Similarly, the audiometer hearing loss dial position is stored in the position register 52 when the input selector 50 is operatively connected to the position encoder 46. In a similar fashion, the printer frequency and hearing loss position may be stored in the position register 52 when the input selector 50 is operatively connected to the position encoders 44 and 48, respectively.

The transfer circuit 54, on command by the main routine control 36, transfers the number in the position register 52 to the reference register 56. The function of the reference register 56 is to store the binary encoded number of the desired position of the position encoder selected by the input selector 50 and this number may be inserted into the reference register 56 from either the position register 52 or from the pretest routine control 34. In accordance with a feature of this invention, as explained in greater detail below, the reference register 56 can also be commanded to add to or subtract from the binary number stored therein.

The direction determination circuit 58 compares the number in the position register 52 with the number in the reference register 56, and determines whether the desired position of the selected input is above or below its present position. The output direction control 62 selects the direction of movement of the output drive needed for the device being controlled to reach the desired position. The coincidence detector 60 continuously compares the numbers in the position register 52 and the reference register 56, and detects when these numbers are in coincidence, to thereby indicate that the device being controlled has reached the desired position. The output on-off control 64 at the output of the coincidence detector 60 turns on the selected output drive until the desired position is reached, and the detection of coincidence results in the selected output drive being turned off. The audiometer hearing loss drive control 72 selects whether the audiometer hearing loss attenuator is controlled in this manner, or whether it is controlled by the pretest routine control 34, or whether it is controlled by the hearing loss direction control 88 and the hearing loss increment control 90, the latter being in the threshold determination portion 26 of the audiometer circuitry.

The threshold determination portion 26 of the audiometer circuit comprises the blocks which are associated with the function of threshold determination. The patient response button 25 allows the patient or subject to indicate to the audiometer when a tone has been heard. The intertone period control 80 determines the variable duration of the intertone period. The tone period control 82 determines the duration of the tone period. The tone switch drive 92 turns on the tone switch during the one second tone period. The score period control 84 determines the duration of the score period during which a patient response is considered correct.

The pattern recognition circuit 86 detects the various patient response patterns, which indicate the patient's threshold. In accordance with the invention, if no recognized pattern is found, the pattern recognition circuit 86 limits the testing at that particular frequency and sends this information to the character selector 98 in the character print out portion 28 of the audiometer circuit. If necessary, the pattern recognition circuit 86 modifies the number in the reference register 56.

The hearing loss direction control 88 controls the direction of the incremental movement of the audiometer hearing loss attenuator during the threshold determination period, while the hearing loss increment control 90 controls the increment size. As set forth in greater detail below, the increment size in this particular illustrative embodiment of the invention advantageously is 5 db or 10 db.

The character print out portion 28 of the circuit relates to the function of printing out the audiological symbols by the recorder or printer on the audiogram card. The right ear-left ear switch 94, which is coupled to the audiometer output switch, indicates the particular ear then being tested. The print out control 96 controls the time of print out. The character selector 98 serves to select the proper one of four different character drives for the printer. Thus, the character selector 98 selects an "x" character drive 102, an "o" character drive 104, a "?" character drive 106, or a "↑" character drive 108, these being the four particular characters which are adapted to be printed out by the typewriter on the audiogram card in this illustrative embodiment of the invention. Manifestly, other character symbols may be utilized, if desired, for printing out on the audiogram card. The color selector drive 100 is connected to the right ear-left ear switch 94 and indicates the particular ear being tested by controlling the color of the character print out. Advantageously, a print out in black indicates the testing of one ear, while a print out in red indicates the testing of the other ear.

*Frequency programming panel*

Having now described generally the function and overall operation of the present invention in terms of the block diagram of FIGURE 2, a description of the specific circuit portions now will be given. In accordance with a feature of this invention, the number and order of the frequencies presented to the patient may be selectively programmed into the automatic audiometer and for this purpose, a frequency programming panel of the type illustrated in FIGURE 3 may be utilized.

As there shown, in this illustrative embodiment of the invention, the frequency programming panel 38 advantageously comprises a matrix of eleven rows and four columns of miniature phone jacks mounted on the panel. The top row comprises the phone jacks 112, 114, 116 and 118 to which the conductors 156, 158, 160 and 162 are respectively connected. When a phone plug is inserted into a jack, a circuit is completed to the jack conductor in a manner well known in the art.

Each of the remaining rows in the frequency programming panel 38 also is comprised of four phone jacks, each adapted to receive a phone plug 120 to complete a connection to its associated conductor. Those skilled in the art now will appreciate that by the selective insertion of phone plugs 120 into the various phone jacks, each row can be made to represent any one of a plurality of binary coded instructions corresponding to the audiometer frequencies or to a stop command for the audiometer.

In accordance with a feature of this illustrative embodiment of the invention, a binary number is assigned to each audiometer frequency and to the stop command as follows:

| Frequency: | Binary number |
|---|---|
| 125 | 0001 |
| 250 | 0010 |
| 500 | 0011 |
| 750 | 0100 |
| 1,000 | 0101 |
| 1,500 | 0110 |
| 2,000 | 0111 |
| 3,000 | 1000 |
| 4,000 | 1001 |
| 6,000 | 1010 |
| 8,000 | 1011 |
| STOP | 1111 |

Since this particular embodiment of the invention is adapted to present an initial one thousand per second pretest tone to the subject, the first row of jacks on the frequency programming panel 38 represents the first frequency to be tested after the initial one thousand cycles per second pretest tone. In FIGURE 3, a phone plug 120 is shown as inserted in the phone jack 118, with the remaining phone jacks of this row being without corresponding phone plugs. As such, it will be appreciated that the coded binary number represented by the first row of the FIGURE 3 illustration is 0001. In accordance with the table set forth hereinabove, this coded binary number corresponds to a frequency of 125 cycles per second. Thus, the audiometer is instructed to present a first frequency of 125 cycles per second to the subject after the initial one thousand cycle per second pretest tone.

The second row of the frequency programming panel 38 shown in FIGURE 3 includes a phone plug 120 inserted only in the phone jack 122. As such, the coded binary number 0010 is represented which corresponds to a second frequency of 250 cycles per second to be presented to the subject. The third row of the frequency programming panel 38 illustrates the phone plugs 120 in the phone jacks 124 and 126, thereby representing the coded binary number 0011. This corresponds to a frequency of 500 cycles per second, which is the third test frequency selectively programmed into the apparatus for presentation to the subject.

The remaining coded instructions illustrated on the frequency programming panel of FIGURE 3 include the binary coded number 0101 for the fourth row, corresponding to a frequency of one thousand cycles per second; the coded number 0111 for the fifth row, corresponding to a frequency of 2,000 cycles per second; the coded number 1001 for the sixth row, corresponding to a frequency of 4,000 cycles per second; the coded number 1011 for the next row corresponding to a frequency of 8,000 cycles per second; and the coded number 1111 for the eighth row of the panel, corresponding to the stop command.

Thus, it will be appreciated, that the binary coded numbers corresponding to the frequency and stop commands can be selectively programmed in any particular order and in any particular number into the automatic audiometer by means of the frequency programming panel 38. While the illustrative frequency programming panel shown in FIGURE 3 discloses 11 groups of phone jacks having four output leads each to reproduce electrically the programming for 11 four digit binary coded numbers, those skilled in the art will appreciate that any number of rows or binary coded configurations can be utilized to instruct the automatic audiometer without departing from the principles of the present invention.

*Pretest routine control*

The pretest routine control 34 shown in the block diagram of FIGURE 2 is more particularly disclosed in the logic diagram of FIGURE 4. The purpose of the pretest routine control is to provide a one thousand cycle per second tone to the subject as the first frequency since the ear is most sensitive to intensity changes at a frequency of one thousand cycles per second and since one thousand cycles per second has the highest test-retest reliability of any frequency in the audiometric range. After the subject's threshold has been determined at this initial one thousand cycles per second frequency, the operator selectively determines the remaining order and number of frequencies at which he wishes to test the subject by the use of the frequency programming panel, as described above.

Referring now to the logic diagram of FIGURE 4, for a complete description of the pretest routine control, it can be seen that the flip-flop 168 is turned on when the start button 30 is operated. The input line 354 is connected to the stop circuit in the main routine control and turns off flip-flop 168 at the end of the test or at such time as the stop button 32 is operated. When the flip-flop 168 is turned off, an output is provided on the output line 194 which serves to reset a number of circuits in the audiometer after a test period.

When the flip-flop 168 is turned on by the start button 30, a pulse is produced at the output of the differentiator 170 which turns on the flip-flop 172. This provides an output signal on the output line 192 which inhibits some of the action of the main routine control 36 during the initial period of starting and threshold approach. The input line 180 is connected to the row selector switch 40 in the position finding circuitry 24, and this input line 180 is in an on state when the row selector switch 40 is not in the "HOME" or starting position. Thus, if at this point, the row selector switch 40 is not in its "HOME" position, the AND gate 174 is energized at both of its inputs, and it provides an output signal on the output line 176. The output line 176 is connected to the row selector switch 40, and when it is on it causes the row selector switch to step in a continuous fashion until this switch reaches the "HOME" position. When the row selector switch 40 is in the "HOME" position, the input line 180 is turned off, which, in turn, turns off the AND gate 174 and the output line 176 to cause the row selector switch 40 to stop its stepping action. The details of the construction and operation of the row selector switch 40 are further disclosed with respect to the explanation herein below in connection with FIGURE 6 of the drawing.

The input line 181 also is connected to the row selector switch 40 and is in the on state when the row selector switch is in its "HOME" position. At this point, both inputs to the AND gate 182 are on to energize the AND gate and turn on the input to the differentiator 184. The output of the differentiator 184 passes through the OR gate 186 to trigger the single shot multivibrator 188. In accordance with one particular illustrative embodiment of the present invention, the single shot multivibrator 188 is constructed such that it is on for a one hundred microsecond period after it receives a triggering pulse.

Output line 190, when turned on by the single shot multivibrator 188, causes the reference register 56 to be loaded with a binary number corresponding to one thousand cycles per second. At the end of the one hundred microsecond period for the single shot multivibrator 188, a pulse is present on the output of the differentiator 196, which pulse triggers the single shot multivibrator 198. Advantageously, single shot multivibrator 198 also has a period of one hundred microseconds, and the output line 200 when energized serves to transfer control of the audiometer to the main routine control 36, which in turn, causes the audiometer frequency drive 68 and the printer frequency drive 70 to go to their one thousand cycle per second position.

The input line 212 comes from the main routine control and is energized into the on condition during the time that the audiometer hearing loss attenuator is being controlled. When the input line 212 is turned on, both inputs of the AND gate 202 are energized and the AND gate 202, therefore, supplies an output pulse which is differentiated by the differentiator 204 and triggers the single shot multivibrator 206, to turn it on for one hundred microseconds. The output 208 of the single shot multivibrator 206, when it is in the on state during this one hundred microsecond period, causes a binary number corresponding to −10 db to be placed into the reference register 56. The main routine control 36 then continues its operation to bring the audiometer hearing loss attenuator to the −10 db position.

The input line 238 is energized into the on state when the coincidence detector 60 detects a coincidence between the numbers in the position register 52 and the reference register 56. When the audiometer hearing loss attenuator reaches the −10 db position, coincidence is reached and the input 238 is turned on to transfer control of the audiometer back to the pretest routine control. At this time, all three inputs to the AND gate 210 are in the on state to provide an output pulse from the AND gate 210 to the differentiator 214. The output of differentiator 214 serves to turn on the flip-flop 216.

At this time, the single shot multivibrator 224 is off, so that its "Zero" output is energized. Therefore, the AND gate 234 is turned on and both of the output lines 218 and 236 are in the on condition. When the output line 218 is in the on condition, it causes the audiometer hearing loss attenuator to be driven in the direction of higher intensity. When the output line 236 is in the on condition, it causes the tone to be turned on.

The input line 240 is connected to the patient response button 25 and is turned into its on condition when the subject depresses the patient response button. Thus, when the subject responds to the tone heard through the earphones, both inputs to the AND gate 220 are turned on and the AND gate provides an output pulse to the differentiator 222. The output of the differentiator activates the single shot multivibrator 224, which in this embodiment of the invention, advantageously remains on for a two second time period. During this time, the "Zero" output of the single shot multivibrator 224 is off, turning off the output 236 and thereby causing the tone to be turned off.

At the end of the two second time period for the single shot multivibrator 224, a pulse is produced at the output of the differentiator 226, which output is transmitted through the OR gate 228 to turn off the flip-flop 216. This causes the output line 236 to remain off and the output line 218 to be turned off, thereby stopping the audiometer hearing loss attenuator at a point 10 db higher than the level at which the patient or subject responded. Also, at this time, when the "Zero" output of the flip-flop 216 is turned on, a pulse is produced at the output of the differentiator 230, which pulse passes through the OR gate 178 to turn off the flip-flop 172. Flip-flop 172, which is on from the beginning of the test to the end of the threshold approach period, remains off for the remainder of the test.

Also, at this time a pulse is produced at the output of the differentiator 232, which pulse passes through the OR gate 186 to trigger the single shot multivibrator 188. As explained above, the single shot multivibrator 188 advantageously has a time period of one hundred microseconds and turns the output line 190 on to once again cause the binary number for one thousand cycles per second to be loaded into the reference register 56. In addition, control of the audiometer is again transferred to the main routine control 36 which insures that the audiometer and the output printer have the correct frequency setting. At this time, however, because the flip-flop 172 is turned off, the AND gate 202 and the AND gate 210 cannot be turned on and the main routine control 36 remains in control of the audiometer for the remainder of the test. As explained in the following section on the main routine control, the main routine control first causes threshold determination and print out to be performed at the one thousand cycles per second frequency selected by the pretest routine control and then goes on to test all of the frequencies which have been selectively programmed into the frequency programming panel 38 by the operator.

*Main routine control*

FIGURE 5 of the drawing illustrates a logic diagram of one embodiment of main routine control circuit which advantageously may be used in the automatic audiometer of the present invention. One of the primary elements of the main routine control is a shift register 242. Those skilled in the art will appreciate that the shift register 242 may be comprised of any one of the many types of shift registers known in the data processing art and, as such, may advantageously comprise a plurality of stages formed of magnetic cores, semiconductor devices, or the like, wherein digital data may be shifted from one stage to another in response to the application of suitable shift signals.

In this particular embodiment of the invention, the shift register 242 takes the form of a five stage register such that the shift register will always be in one of five distinct states, here designated for convenience as the states "$T_A$," "$T_B$," "$T_C$," "$T_D$," and "$T_E$." A separate output line is provided in the shift register for energization when the latter assumes each of these five distinct states, and these energized output lines serve to control the audiometer sequence of operations as well as to determine the settings of the input selector 50 and output selector 66 in the position finding circuitry 24. As explained below, shift register state $T_A$ controls the loading of the frequency number into the reference register 56; during state $T_B$, the audiometer frequency drive 68 is brought to the proper position; during state $T_C$, the printer frequency drive 70 is brought to the proper position; during state $T_D$, threshold determination is accomplished by controlling the position of the hearing loss attenuator drive 74 and the setting of the tone switch drive 92; and during state $T_E$, the printer hearing loss drive 76 is brought to the proper position for character print out upon the audiogram card.

In the operation of the main routine control, the state of the shift register 242 is shifted by the output from the single shot multivibrator 258 each time the task to be performed during a given state has been completed. The input line 248 is connected to the output of the position finding circuitry and indicates when the desired position has been reached. This input 248 will be on at the end of states $T_B$, $T_C$, and $T_E$. Also, it is on once during the state $T_D$ while in the pretest period, but the other input to the AND gate 252, which is off only during the $T_D$, closes the AND gate 252 for this undesirable pulse. The input to the differentiator 254 comes from the single shot multivibrator 290 which is turned on at the end of states $T_A$ and $T_D$. The output of either the AND gate 252 or the differentiator 254 is applied through the OR gate 256 to trigger the single shot multivibrator 258, to produce an output pulse therefrom which causes the shift register 242 to shift to the next succeeding state.

The input line 192 is connected to the output of the pretest routine control, as previously explained, and allows certain functions to occur only during the initial period of starting and threshold approach. The input 244 carries the complement of the input 192 and inhibits certain functions during this initial period. The input 246 is connected to the row selector switch 40 and is turned on after the row selector switch 40 has been stepped, a condition which occurs at the end of the state $T_E$ and during the pretest period.

Input 244 closes the AND gate 262 during the pretest period, so a pulse is produced at the output of the AND gate 262 only at the end of the state $T_E$. This output pulse from the AND gate 262 triggers the single shot multivibrator 264 to set the shift register 242 into the initial state $T_A$. Thus, it will be appreciated that during the pretest period input 244 is in its off state and so prevents the stepping switch pulses over input 246 from passing AND gate 262 during the initial period while the stepping switch is seeking its HOME position.

The input 200 is connected to the output of the single shot multivibrator 198 in the pretest routine control and when a pulse appears on this input, the shift register 242 is set to the state $T_B$, and the main routine control assumes control from the pretest routine control. The input 194, when it is turned on, resets the circuit at the completion of testing.

As shown in FIGURE 5, the output of the single shot multivibrator 264 also is connected to the input of the differentiator 280, and this input is turned on after the shift register 242 has been set to the state $T_A$. The input to the differentiator 284 is turned on after threshold determination has been made during the state $T_D$. The common input to the AND gates 282 and 286 is connected to the input 244 and therefore, these gates are closed during the pretest period. Pulses from the OR gate 288, which are present when either of the AND gates 282 or 286 are opened, are applied to trigger the single shot multivibrator 290 which in this illustrative embodiment of the invention serves to provide a one hundred microsecond pulse on the output 306. This output is connected to an input of the position finding circuitry, to cause the reference register 56 to be loaded with the number in the position register 52. The single shot multivibrator 290 also is connected through the differentiator 254 and OR gate 256 to the single shot multivibrator 258 such that at the end of the pulse output of the single shot multivibrator 290, the single shot multivibrator 258 is triggered to provide a shift pulse to the shift register 242 in the manner previously described.

The OR gate 302 is connected by the differentiators 292, 294, and 296 to the shift register outputs $T_B$, $T_C$, and $T_E$ respectively. In addition, the OR gate 302 is connected through the AND gate 300 and the differentiator 298 to the shift register output $T_D$. As such, OR gate 302 serves to provide trigger pulses at the beginning of the shift register states $T_B$, $T_C$, and $T_E$, and also at the beginning of the shift register state $T_D$ during the initial period of threshold approach during the pretest period. The latter results when the AND gate 300 is turned on by the energization of its $T_D$ input through the differentiator 298 and a set input from the input 192. The output of the OR gate 302 is connected to the single shot multivibrator 304 which, at the beginning of each of these states, produces a one hundred microsecond pulse on output 308. This output is connected to an input of the position finding circuitry and instructs the latter to find the position given in the reference register 56.

The AND gate 312 has one input connected through the differentiator 310 to the $T_D$ output of shift register 242 and another input connected to the input line 244. As such, the AND gate 312 passes a trigger pulse to turn on the flip-flop 316 at the beginning of state $T_D$ except during the initial threshold approach during the pretest period when the input 244 is turned off. The output 318 of flip-flop 316 is connected to the intertone period control 80 in the threshold determination circuit and when this output is on, it serves to initiate the threshold determination period. The output 320 of the flip-flop 316 resets the threshold determination circuitry when the output is turned on by the resetting of the flip-flop 316. The flip-flop 316 may be reset by either of the two inputs to the OR gate 314, namely, the reset signal at the end of the testing period which appears on the input 250 or by the output of the pattern recognition circuit 86, which is turned on when threshold has been determined.

The input 180 is connected to the row selector switch 40 in the position finding circuitry and is turned on when the row selector switch is not in the HOME position. Input 326 is turned on after a character has been printed out by the character print out portion 28 of the audiometer. Since input 326 is connected to the AND gate 332 through the differentiator 330, and the input 180 is also connected to the AND gate 332, after a character has been printed out on the audiogram card for the first frequency tested after the initial one thousand cycles per second test, the AND gate 332 is turned on to pass a trigger pulse which turns on the flip-flop 336. The flip-flop 336 is turned off by the reset signal passed through the OR gate 334 and is held in its off condition during the initial one thousand cycles per second threshold approach.

The input 181 is connected to the output of the position finding circuitry and is turned on when the row selector switch 40 is in the HOME position. This occurs during the initial test at one thousand cycles per second and during the last frequency test programmed into the frequency programming panel 38. Thus, after the character has been printed out on the audiogram card for the last programmed frequency tested as indicated by a signal passed through the differentiator 338, all inputs to the AND gate 340 are turned on. This causes the AND gate 340 to pass a pulse through the OR gate 348 and OR gate 350. As a result, the output 354 is turned on and since this output is connected to the flip-flop 168 of the pretest routine control, the audiometer is caused to be turned off and reset in the manner explained above in connection with the operation of the pretest routine control portion of the circuit. The output 354 is also turned on when the output of the AND gate 342, AND gate 344, AND gate 346, or the input 378 is turned on. The input 378 is connected to the stop button 32 and is turned on when the stop button 32 is actuated to also cause the audiometer to turn off and be reset.

The input 356, connected to the AND gates 342, 344 and 346, is associated with the coincidence detector 60 in the position finding circuitry 24 and is turned on when a new position is being sought. The input 358, connected to the AND gates 342 and 344, is connected to the output direction control 62 and is turned on when this control is in its "Forward" condition. The output 360, connected to the AND gate 346, is connected to the output direction control 62 and is turned on when the latter control is in its "Reverse" condition. The inputs 362, 364, 368, 372, and 376 are connected to the position register 52 in the position finding circuitry 24 and respectively indicate the complements of the first five digits of the number in the position register 52. The inputs 366, 370 and 374 also are connected to the position register 52 and respectively represent the third, fourth and fifth digits of the number in the position register.

In the operation of the inventive automatic audiometer, if the number in the position register is 01100, or greater, and the shift register 242 is not in the state $T_D$ or $T_E$, and the command is given for the audiometer drives to go to a higher position, all of the inputs to the AND gate 342 will be turned on. Thus, if either the audiometer frequency dial or the printer frequency drive is beyond 8,000 cycles per second and is being driven to a higher position, the audiometer will be turned off by the signal on the output 354. If the number in the position register 52 is 11000, or greater, and the command is given to go to a higher position, the AND gate 344 will be turned on since all of its inputs will be energized. Thus, if either the audiometer hearing loss dial or the printer hearing loss drive is beyond 100 db, and is being driven towards a higher position, the audiometer will be turned off by the signal on the output 354.

If the number in the position register 52 is 00000, and the command is given to go to a lower position, all of the inputs to the AND gate 346 will be turned on and the AND gate 346 will be turned on. Thus, if any of the output drives is below 125 cycles per second, or −10 db, and is being driven towards a lower position, the audiometer will be turned off by the signal on output 354. Thus, it is clear that in accordance with a feature of the present invention, the AND gates 342, 344 and 346 serve to provide protection to the output drive if an error is made by the position finding circuitry.

*Position finding circuitry*

The construction and operation of the position finding circuitry will now be described with reference to the illustrative embodiment disclosed in block form in FIGURE 2 of the drawing and disclosed in logic form in FIGURE 6 of the drawing.

While a logic diagram of one illustrative embodiment of the position finding circuitry 24 is illustrated in FIGURE 6 of the drawing, it will be advantageous to briefly review the philosophy of the position finding circuitry before going into a detailed description of the logic diagram. The present inventive automatic audiometer, like many other types of computer devices, comprises as one of its main circuit sections a routine control function which establishes, by means of specially generated signals, the time sequence for the operation of main events. This is pre-programmed in the sense that it is wired into the machine, and in this particular illustrative embodiment, is represented by the blocks 34 and 36 of FIGURE 2, identifying the pretest routine control and main routine control, respectively. In the operation of the present invention, the entire position finding interval, which must precede the positioning of any one of the outputs (i.e., the audiometer frequency drive 68, the audiometer hearing loss or db drive 74, the carriage position on the typewriter or printer frequency drive 70, and the roller position on the typewriter or printer hearing loss drive 76) is initiated by an appropriate signal from the routine control portion 22 of the circuit. If, the position finding circuitry 24 is to be able to correctly position any one of the outputs, then it must have the following information:

(1) It must know the present position of the output device to be controlled.

(2) It must be able to determine the desired position or address of the output device to be controlled.

With these two pieces of information, the position finding circuitry must be able to perform the following functions:

(1) It must be able to decide whether the present position of the output device to be controlled is a higher or lower number than the desired position.

(2) It must have the means of converting its knowledge of a higher or lower number to the rotation of a shaft in the proper direction. Since there are several outputs, this means that it must also be able to make a prior decision involving the selection of the correct output in accordance with the dictates of the routine control signal.

(3) It must have the means of recognizing when the output to be controlled (such as the audiometer frequency dial or db attenuator dial) has reached the point in its rotation where its position corresponds with the desired position.

(4) It must have means for implementing its knowledge that coincidence between the output position and the desired position has been reached by shutting off power or in some manner stopping the control output.

With the above major philosophical points of the position finding circuitry in mind, a detailed description can be given with particular reference to FIGURE 6 of the drawing. As there shown, the position finding circuitry comprises a position register 52 which is the register that at an appropriate time contains the binary address position describing the present position of the control output. The position finding circuit also includes a reference register 56 which is the register that carries in binary code the desired address position that the control device is to be moved to in each different mode of operation of the automatic audiometer.

In the manner explained in greater detail hereinbelow, the source of the desired binary address position to be loaded into the reference register 56 is different for each different mode of operation of the automatic audiometer. Thus, in connection with the control of the frequency dial position, it can be seen that the source of this number is the external frequency programming panel 38. During the operation of the pattern recognition circuit 86, the number loaded into the reference register 56 is the final position of the db attenuator after a pattern has been detected, plus or minus a certain number of digits, depending upon the type of pattern recognized. The output of the pattern recognition circuit 86 provides a suitable number of pulses to arithmetically operate on the reference register 56. After this arithmetical operation, the number in the reference register 56 is used to control the angular position of the typewriter carriage roller, so as to type the appropriate hearing loss symbol at the proper hearing loss db level on the audiogram card. For control of the proper position of the typewriter carriage, so as to type out the hearing loss symbol at the proper frequency position on the audiogram card, the reference register 56 obtains its information from the frequency programming panel 38. Thus, for the control of the typewriter carriage, as well as for the control of the frequency dial position, the source of the address is the same, namely, the frequency programming panel 38.

The position finding circuitry of FIGURE 6 further comprises a subtract register and a binary to serial pulse generator which together form a direction determination circuit 58. The subtract register is the register which at an appropriate time, is loaded with the number from the position register 52. A one digit is subtracted from the number in the subtract register each time a pulse is applied to it. As explained in greater detail below, the subtract register is utilized in deciding whether the number in the reference register 56 is higher or lower than the number in the position register 52. The binary to serial pulse generator also is used in connection with the mechanism of deciding whether the number in the position register 52 is higher or lower than the number in the reference register 56. Towards this end, the binary to serial pulse generator converts the binary number in the reference register 56 to an equivalent series of pulses. These pulses then are applied to the subtract register to subtract from the number loaded therein, which is the number originally in the position register 52. After the subtraction operation, the remainder in the subtract register is examined to set a flip-flop which controls the direction of rotation of the output in a manner depending upon whether or not the entire number originally loaded in the subtract register was subtracted out or whether a remainder exists after the subtraction operation.

Therefore, it can be seen that the purpose of the components in the position finding circuitry 24 is to decide which way and how much to turn the shaft of the four output drives. The position finding circuitry 24 is used over and over again in all of the main program sequences. For example, in the pretest period, which is used for subject familiarization, the position finding circuitry is involved in establishing an initial threshold determination at one thousand cycles per second. It also positions the frequency dial at one thousand cycles per second and it positions the typewriter carriage so as to properly position the audiogram card at the desired frequency. The manner in which the position finding circuitry is used in the various main program sequences will now be described in detail with specific reference to the logic diagram of FIGURE 6.

In the operation of the position finding circuitry, the proper row of the frequency programming panel 38 is selected by the row selector switch 40. Advantageously, as illustrated in FIGURE 6, the stepping switch 40 may comprise four decks of contacts 414, 416, 418 and 420, and an energizing coil 426 for stepping the rotatable contact arms when energized, the interrupting contacts 424, and a HOME switch 42.

The input 176 is connected to an output of the pretest routine control 34 as previously described. The input 176 is energized or turned on when, at the beginning of a test, the pretest routine control 34 gives the instruction to bring the row selector switch 40 to the HOME position and remains turned on until the HOME position is reached by the stepping contact arms of the row selector switch. When the input 176 is on, and the stepping switch coil 426 is unenergized, both inputs to the AND gate 428 will be energized to cause a pulse to pass through the AND gate 428, and the OR gate 432 to turn on flip-flop 434. This causes the relay driver 436 to energize the relay coil 438, thereby closing the contacts 440 and completing the power circuit to energize the stepping switch coil 426.

When the stepping switch coil 426 is fully energized, the interrupting contacts 424 switch position and turn on the reset input of the flip-flop 434, thereby turning the flip-flop off and causing the stepping switch coil 426 to be deenergized. At this time, the stepping switch wiper arms for each contact deck 414, 416, 418 and 420 move to the next contact position. Also, the interrupting contacts 424 return to the unenergized or rest position. If, at his point, the row selector stepping switch 40 is still not in the HOME position, the cycle once again repeats and continues to repeat until the stepping switch wiper arms reach the HOME position contacts. At this time, the HOME contacts 422, which are ganged with the stepping switch wiper arms, are switched to the HOME position.

The switching of the HOME contacts 422 to the HOME position causes the output 181 to be turned on to signal the pretest routine control 34 to go on to the next step. When the HOME contacts 422 are not in the HOME position, this turns on the output 180 which indicates to the pretest routine control 34 that the row selector stepping switch 40 is not yet in its HOME position. In this manner, the row selector switch 40 is stepped to its HOME position upon command of the pretest routine control, and when such position is reached, the pretest routine control is signaled to proceed to the next step of the test.

The input 246 advantageously is energized or turned on for one hundred microseconds after a character has been printed out on the audiogram card by the typewriter following a threshold determination of the subject at a particular frequency. This one hundred microseconds pulse serves to turn on the AND gate 430, if the interrupting contacts 424 also are in their rest position. In this manner, the energization of input 246 can turn on the flip-flop 434 and energize the stepping switch coil 426. However, under these circumstances, it will be appreciated that the stepping switch will step only once, since by the time one switching action has been completed, the one hundred microseconds pulse at the input 246 will be ended.

The four outputs from the stepping wiper arms of the four decks of row selector switch 40 serve to carry the binary number for the frequency selected from the frequency programming panel 38. Manifestly, this binary number will be determined by the position of the four stepping switch wiper arms and the particular telephone jacks of the frequency programming panel 38 to which they are connected in that particular position. Thus, as the four wiper arms of the row selector switch 40 step from one contact position to another, the four decks of the row selector switch are sequentially connected to succeeding rows of the frequency programming panel 38, and the manner in which the frequency programming panel is programmed by the selective insertion of telephone plugs into the jacks, in the manner previously described, will determine each particular binary number output of the row selector switch.

The four inputs 380 carry the binary number corresponding to the audiometer frequency position. The four inputs 382 carry the binary number corresponding to the printer frequency position. The five inputs 384 carry the binary number corresponding to the audiometer hearing loss position, and the five inputs 388 carry the binary number corresponding to the printer hearing loss position. As explained in greater detail hereinbelow, with reference to FIGURE 7, each of these groups of inputs is connected to a binary coded disc coupled to the four output drives in questions such that a binary number corresponding to the position of each of the output drives is provided by each of the respective binary coded discs to its associated group of inputs. In this manner, each of the groups of inputs 380, 382, 384 and 388 continuously carries the binary coded number information indicating the instantaneous position of its associated output drive. The binary coded discs also provide timing pulses over the inputs 380T, 382T, 384T, and 388T, which timing pulse inputs are turned on when their respective position binary coded discs are accurately positioned within the range of positions corresponding to a single binary number, thereby preventing the generation of an ambiguous code over the input groups.

The inputs 392, 394, 396, 398 and 400 are connected to the main routine control 36 and serve to select the desired group of position inputs required by the position finding circuitry for each step of its operation. Since only one input of the group of inputs 392, 394, 396, 398 and 400 is energized or turned on for each particular step, only one of the position input groups 380, 382, 384 and 388 will be effective in the position finding circuitry during each particular step of its operation.

The OR gates 452, 464, 476, 488, 500 and 512, and their associated AND gates connected to their inputs comprise the input selector, shown as the block 50 in FIGURE 2 of the drawing. When the input 392 is turned on, the inputs 394, 396, 398 and 400 are turned off (since as stated above, only one input is energized at any particular time), and therefore, the AND gates 444, 446, 448 and 450 are turned off. Obviously, those skilled in the art will appreciate that the corresponding AND gates of the other sections of the input selector also are off at this particular time.

The input 392 is connected to the AND gate 442 which also has an input from the wiper arm 414 of stepping switch in the row selector switch assembly 40. In a similar fashion the AND gate 454 has the inputs 392 and the wiper arm 416 from stepper switch, the AND gate 466 has inputs from 392 and the wiper arm 418 of stepper switch, and the AND gate 478 has inputs from 392 and the wiper arm 420 of stepper switch. Thus, when the input 392 is energized, these AND gates are turned on in accordance with the frequency number from the selected row of the frequency programming panel 38, which number is also present at the output of the OR gates 452, 464, 476 and 488. In accordance with the operation of this particular embodiment of the invention, the OR gate 500 is used only for the five digit hearing loss numbers and its output is not turned on for the four digit frequency numbers provided by the frequency programming panel 38 through the row selector switch 40. Also, in this particular embodiment of the invention, the OR gate 512 is used to select the proper positioning input from the selectively energized input lines.

The outputs of the input selector 50 are fed to the inverter pairs comprising the position register 52. The inverters 516, 520, 524, 528 and 532 provide an output corresponding to the selected binary number with the inverter 516 corresponding to the least significant digit and inverter 532 corresponding to the most significant digit of this number. It also will be appreciated, that the inverters 514, 518, 522, 526, and 530 provide the complement of the selected binary number fed to the position register 52 by the input selector 50. The output of the position register 52, comprising the selected binary number and its complement, are fed to the coincidence detector 60, the reference register 56, and the direction determination circuit 58.

The flip-flops 584, 586, 588, 590, and 592 comprise the storage elements of the reference register 56. In the illustrative embodiment shown, the flip-flop 584 serves to store the least significant digit of the binary number contained in the register while the flip-flop 592 serves to store the most significant digit of the binary number.

The input 406 is connected to the pretest routine control 34 and when it is turned on, it serves to load the number 00001 into the reference register 56. The input 408 also is connected to the pretest routine control 34 and when it is turned on, it serves to load the number 00101 into the reference register. The input 402 is connected to the pattern recognition circuit 86 and serves at the beginning of a pulse to decrease the number in the reference register 56 by the value of one. The input 404 also is connected to the pattern recognition circuit 86 and serves at the beginning of a pulse to increase the number in the reference register 56 by the value of one.

The AND gates 576 and 578 in the input circuitry for the flip-flop 584, and their equivalent AND gates in the input circuit of the remaining flip-flops 586, 588, 590 and 592 of the reference register 56, comprise the transfer circuit, shown as the block 54 in the block diagram of FIGURE 2. The input 306 is connected to the main routine control 36 and when it is turned on, it causes the number in the position register 52 to be loaded into the reference register 56 by suitable energization of the AND gate in the transfer circuit and the OR gate connected between the transfer circuit and the memory flip-flop, as for example, the OR gates 580 and 582 connected between the transfer circuit AND gates 576 and 578 and the flip-flop 584 in the first stage of the reference register. Those skilled in the art therefore, will readily appreciate that by using one or more of the above means of loading the reference register 56, the latter serves to store the number corresponding to the desired position of the selected input.

The coincidence detector 60 in the position finding circuitry 24 advantageously comprises the OR gates 534 and 536 associated with the least significant digit of the binary number, the OR gates 538 and 540 associated with the next digit of the binary number, OR gates 542 and 544 associated with the next succeeding digit of the binary number, OR gates 546 and 548 associated with the next succeeding digit, and the OR gates 550 and 552 associated with the most significant digit of the binary number. In addition, the coincidence detector comprises the AND gate 554. Each of the OR gates for the binary number has an input connected to an inverter pair of the position register 52 and an input connected to a memory flip-flop of the reference register 56. In this manner, the OR gates compare each digit and the complement of each digit of the binary number in the position register with the complement of the corresponding digit position of the number in the reference register 56. If the two numbers in the position and reference registers are the same, then for each digit, either the digit or its complement will be a binary one, thereby causing all of the digit OR gates to be on. Since the AND gate 554 has an input connected to the outputs of each of the digit OR gates in the coincidence detector, the AND gate 554 will be turned on to indicate coincidence between the numbers in the position and reference registers, thereby indicating that the particular output drive being examined is at the proper and desired position for the next step of operation of the automatic audiometer. However, if the two numbers in the position and reference registers are not the same, and coincidence is not indicated by the AND gate 554, then at least one of the digit OR gates 534, 536, 538, 540, 542, 544, 546, 548, 550 or 552 will be turned off and the output AND gate 554 also will be turned off, indicating a lack of coincidence. Under these circumstances, the proper controls in the automatic audiometer must be energized to rotate the output drive being controlled in a selected direction and for a selected amount until such coincidence is achieved and indicated.

The input 308 is connected to the main routine control 36 and is turned on when a new position for a controlled output drive is to be found. This turns on the flip-flop 562, by a pulse passed through the differentiator 560, which indicates that the proper output drive should be turned on in order to reach the new position. Flip-flop 562 remains on until the AND gate 558 at the output of the inverter 556 indicates coincidence has been found and the output drive and its associated binary coded disc are accurately and properly positioned. Flip-flop 562 is reset as a result of a pulse which passes from the output of the coincidence detector through the AND gate 558 and OR gate 564. At this time, the reset operation of the flip-flop 562 causes a pulse to pass through the differentiator 566 and the inverter 568 to the output 248 to indicate to the main routine control that the desired position has been obtained.

The subtract register 386 and the binary to serial pulse generator 390 comprise the direction determination circuit illustrated by the block 58 in the block diagram of FIGURE 2. The subtract register 386 advantageously comprises the flip-flops 608, 610, 612, 614 and 616 which, through their input logic, are loaded with the number in the position register 52. For example, the least significant digit in the position register 52 is applied in its normal and complemented form from the inverter pair elements 514 and 516 to the AND gates 600 and 602 connected respectively, through the OR gates 604 and 606, to the set and reset inputs of the flip-flop 608. The AND gates 600 ad 602 each are connected to the input 308 and are turned on when the input 308 is energized to indicate that a new position is to be found. The input 194 is turned on after the test period, and is used to reset the flip-flop in the subtract register 386 and the flip-flop 562 at the end of testing.

The flip-flop 700 has its set input connected to the flip-flop 562 at the output of the coincidence detector 60 and its reset input connected to the output of AND gate 698, to which are connected all of the outputs of the flip-flops in the substract register 386. As such, the flip-flop 700 serves to control the direction of rotation of the desired output drive. The on state of flip-flop 700 corresponds to reverse rotation while the off state of the flip-flop corresponds to forward rotation of the desired output drive being controlled. The set input to the flip-flop 700 is off only when a new position is being sought, as indicated by a lack of coincidence output from the coincidence detector 60, but the flip-flop 700 itself will not be turned off until the reset input is energized when the AND gate 698 is turned on.

The input 410 is the complement of the input 308 and therefore is turned off when a position is to be found. At the end of this time, the flip-flop 620 is turned on as a result of the pulse passing through the differentiator 618 from the input 410. This serves to turn on the AND gate 628 connected between the 100 kilocycle square wave oscillator 626 and the counter comprised of the flip-flops 630, 632, 634, 636 and 638. The counter continues to count all of the pulses from the square wave oscillator 626 until the flip-flop 638 is turned on, thereby turning off the flip-flop 620 by means of a feedback circuit from the flip-flop 638 through the differentiator 624 and the OR gate 622 to the reset input of the flip-flop 620. This serves to close the AND gate 628 and to reset the counter. During the period that the flip-flop 620 is turned on, the flip-flop 630 has produced a total of 16 pulses, the flip-flop 632 has produced a total of 8 pulses, the flip-flop 634 has produced a total of 4 pulses, the flip-flop 636 has produced a total of 2 pulses, and the flip-flop 638 has produced a total of 1 pulse.

The AND gate 640 in the binary to serial pulse generator has its inputs connected to the counter flip-flop 630 and the flip-flop 592 in the reference register 56. When the flip-flop 592 is turned on, indicating that the most significant digit of the binary number in the reference register is a binary one, the AND gate 640 passes the 16 pulses from the counter flip-flop 630 through the differentiator 652 and the OR gate 662. Similarily, the AND gates 642, 644, 648 and 650, connected respectively to the outputs of the counter flip-flops 632, 634, 636 and 638, produce pulses corresponding to the other digits of the number in the reference register. Since the outputs of these AND gates are connected through suitable differentiators to the OR gate 662, it will be appreciated that the output of the OR gate 662 will comprise a total number of serially applied pulses corresponding to the binary number in the reference register. In other words, the circuit has converted the binary number in the reference register to an equivalent number of serial pulses at the outputs of the OR gate 662. These pulses are applied from the OR gate 662 to the input gate 594 of the subtract register 386. In this manner, the number in the subtract register 386 is reduced by one for each pulse applied thereto with the overall reduction of the number in the subtract register being equal to the number stored in the reference register 56.

It now will be appreciated that if the number originally in the subtract register 386 was equal to the number in the reference register 56, the number in the subtract register will be reduced to 00000 after the subtraction process is completed and that all of the flip-flops 608, 610, 612, 614 and 616 in the subtract register will be turned off. When one more subtraction pulse is applied to the subtract register 386, all of the flip-flops are turned on. Thus, if the number originally in the subtract register 386 was less than the number in the reference register 56, a point will be reached where all of the inputs to the AND gate 698 will be on to turn off the flip-flop 700 and thereby cause the desired output to switch to forward rotation.

The AND gates 668, 670, 672, 674, 676, 678, 680 and 682 comprise the output selector 66, also shown in the block diagram of FIGURE 2. The inputs 394, 396, 398 and 400 of the position finding circuitry, which determine which group of position inputs is selected for the particular operating step of the automatic audiometer, also are connected to the output selector AND gates and thereby cause the output selector 66 to select the corresponding output. The AND gates 668, 672, 676, and 680 select which output is to be given the on-off commands from the flip-flop 562. The AND gates 670, 674, 678, and 682 select which output is to be given the forward-reverse commands from the flip-flop 700.

The output 684, when turned on, causes the audiometer frequency drive to be turned on. The output 686, when turned on, causes the audiometer frequency drive, which is normally in reverse, to go into forward. In a similar manner, the outputs 688 and 670, 698 and 692, and 694 and 696, respectively control the printer frequency drive on and forward conditions, the audiometer hearing loss drive on and forward conditions, and the printer hearing loss drive on and forward conditions.

Figure 7B:
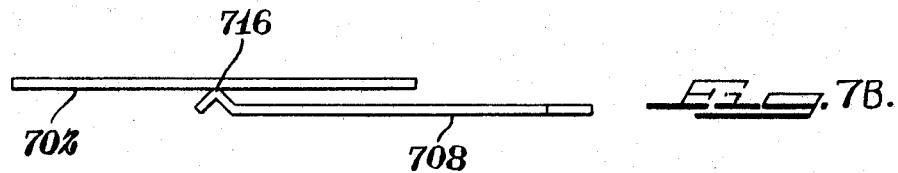
FIGURE 7 illustrates one embodiment of binary coding wheel which may be utilized with the pattern recognition circuitry to generate binary code signals corresponding to the angular position of the frequency dial, hearing loss or decibel attenuation dial, typewriter carriage and typewriter roller, to be controlled.
Figure 7A:
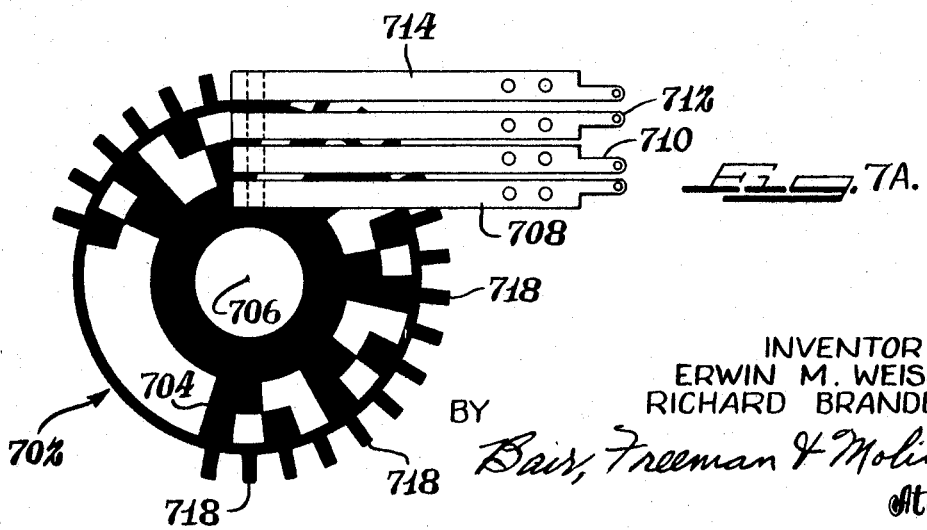

As explained above, each output drive is operatively associated with a binary coded disc which rotates with the output drive and provides a digital output representative of the output drive position to the proper inputs of the position finding circuitry. FIGURE 7 of the drawing illustrates one type of binary coded disc which advantageously may be untilized for this purpose. As there shown, the binary coded disc 702 advantageously comprises a disc of insulating material having a plurality of conductive segments 704 positioned thereon. The conductive segments 704 may be provided on the insulating disc 702 in any suitable manner known to those skilled in the art. Thus, it can be seen that the disc 702 comprises a matrix of conducting and non-conducting paths which generate the binary electrical code corresponding to the angular position of the device to be controlled. Since the binary coded disc 702 is coupled to the rotating shaft 706 of the device to the controlled, it rotates, therewith and the instantaneous position of the devise to be controlled will be indicated by the particular pattern of conductive segments engaging the plurality of wiper contacts 708, 710, 712 and 714 at any particular time.

Advantageously, the wiper contacts 708, 710, 712 and 714 are formed of suitably flexible leaf spring materials having a tapered contact point 716 adapted to be in wiping engagement with the binary coded disc 702 as the latter is rotated.

In this manner, each angular position of the device to be controlled is a discrete binary code or address, comprising four binary digits, which is picked off by the flexible wiper contacts for feeding to the position finding circuitry 24 of the automatic audiometer.

In the present invention, four such binary coded discs are utilized to provide the desired position input information to the position finding circuitry, such four binary coded discs being indicated in the block diagram of FIGURE 2 as the digital position encoder 42 for the audiometer frequency dial, the digital position encoder 44 or the printer frequency information from the printer or typewriter carriage, the digital position encoder 46 for the audiometer db or hearing loss dial, and the digital position encoder 48 for the printer hearing loss information from the typewriter roller carriage.

In addition to the binary coded position number for each output device to be controlled, the binary coded disc 72 also generates a series of timing pulses. These pulses are generated by the conductive segments 718 located on the outermost circumference of the disc 702. It will be noted from FIGURE 7 that the conductive timing segments 718 are positioned around the periphery of the disc at angles coincident with the radial centerline of a binary code. As such, coincidence can be indicated by AND gate 558 only when the flexible wiper contact 714 is on a timing segment 718. Thus, ambiguous codes are prevented from being generated, such as might occur, for example, in the absence of the timing segment if the remaining wiper contacts were positioned between adjacent codes on the disc 702. Manifestly, those skilled in the art will appreciate that other mechanisms for providing the position information signals for the output control devices and for preventing the generation of ambiguous codes may be utilized in the invention in lieu of the particular illustrative embodiment shown in FIGURE 7.

*Pattern recogniton circuit*

It will be appreciated by those skilled in the art, as the principles of the present invention become fully understood, that a key component in the inventive combination is the pattern recognition circuit which is capable of evaluating the subject's responses to the applied stimuli and recognizing the occurrence of an acceptable response pattern. It further will be appreciated that the combination of the pattern detector with the testing apparatus is in itself highly novel and that the pattern detector can take several different forms within the combination in accordance with the present invention. One specific illustrative embodiment of a pattern recognition circuit is shown in greater detail in the logic diagram of FIGURE 8 and now will be described.

Essentially, this pattern recognition circuit comprises a counter, an error storage shift register, a response storage shift register, and a plurality of pattern detectors. The counter serves to count the number of score periods after a patient or subject first changes the nature of his response from "hear" to "don't hear," or from "don't hear" to "hear." A score period is that period of time during the test when a patient or subject may make a proper response by actuating the patient response button 25 to indicate that a tone has been heard.

The error storage circuit 748 is a shift register which stores the error responses during the last three non-score periods. Information is shifted in the register 748 at the beginning of the score period and the register is cleared at the end of the threshold determination period. The outputs of the error storage shift register 748 are on if an error response was made by the subject during the last three non-score periods.

The response storage circuit 758 is a shift register which stores the responses made by the subject during the last four score periods. Information is shifted down the register at the end of the score period and the register is cleared at the end of the threshold determination period. The outputs of the response storage circuit 758 indicate how the patient has responded during each of the last four score periods.

The pattern detectors comprise a number of circuits which detect a number of pre-programmed patient response patterns. Outputs are obtained from the pattern detectors only if recognizable patterns have developed after four or more score periods and if there have been no errors during the last three non-score periods. A first output is obtained if a pattern is recognized that indicates a threshold has been reached at the last setting of the attenuator. A second output is obtained if a pattern is recognized that indicates a threshold 5 db below the last setting of the attenuator and a third output is obtained if a pattern is recognized that indicates a threshold 5 db above the last setting of the attenuator. When a pattern is detected, or, if no pattern is detected after seven score periods following the subject's first change in type of response, the threshold determination period is terminated.

In the operation of the pattern recognition circuit, as shown in FIGURE 8, the input 786 is connected to the hearing loss increment control 90 and is turned on when the hearing loss increment control 90 causes the audiometer hearing loss attenuator 74 to move in a 5 db increment which condition occurs only after the subject's first change in type of response. The serially connected flip-flops 734, 736 and 738 form a three digit binary counter which counts the number of score periods after the patient first changes his type of response. The AND gate 740 is connected to the outputs of the flip-flops 734, 736 and 738 and therefore, is turned on after the seventh score period. The output 728 from the AND gate 740 is turned on at this time and indicates to the character selector 98 that no acceptable pattern has been recognized within the allotted number of tone presentations.

The input 320 is connected to the reset inputs of the flip-flops 734, 736 and 738 in the binary counter and assumes the state zero only during the threshold determination period. The input is turned on to reset the flip-flops of the counter as well as the flip-flops 746, 756, and the shift registers 748 and 758, after the threshold determination period.

The input 724 assumes the state zero only during the score period. The input 240 is connected to the patient response button 25 and assumes the state one when the patient response button is actuated by the subject. Input 724 is connected to the AND gate 742 at the input to the error storage shift register 748, to the AND gate 750 at the output of the error storage shift register 748, and to the OR gate 754 at the reset input of the response storage shift register 758. Similarly, the input 240 is connected to the AND gate 742 at the input of the error storage shift register 748 and to the AND gate 752 at the input of the response storage shift register 758. Thus, if the patient responds at a time outside of the score period, the flip-flop 746 is turned on.

The input 726 assumes the state one during the score period and is connected to the OR gate 744 at the reset input of the error storage shift register 748 as well as to the AND gate 752 at the input of the response storage shift register 758. Thus, the flip-flop 746 is turned off at the beginning of each score period and its state at this time indicates whether or not the patient response error was made during the previous non-score period. This information is shifted into the shift register 748 at the beginning of the score period. The shift register 748 thereby indicates whether an error has been made for each of the three latest non-score periods.

Similarly, the flip-flop 756 indicates at the end of a score period whether the patient has actuated the patient response button 25 during the score period. This information is shifted into the response storage shift register 758 at the end of each score period. The response storage shift register 758 indicates the patient's response during each of the four latest score periods at the conductors connected to the four pairs of outputs of the response storage shift register 758.

Output 730, when changing from state zero to the state one, indicates that the patient's response has changed from "I don't hear" to "I hear" during the previous score period. The output 732, when changing from the state zero to the state one, indicates that the patient's response has change from "I hear" to "I don't hear" during the previous score period.

The AND gate 750 at the output of the error storage shift register 748 is on during a non-score period if, after four score periods following the patient's change of response, no errors have been made during the three latest non-score periods. The output of the AND gate 750 is used to allow patterns to be recognized at the end of a score period only after there have been a sufficient number of responses to determine a pattern and if the patient has not been making errors.

The AND gates 760, 762 and 764 are typical of a larger number of pattern detectors that advantageously may be utilized in the automatic audiometer invention to detect response patterns from which a threshold can be determined. The AND gate 760, for example, is connected to detect the pattern "I hear, I don't hear, I hear." For this pattern, the patient's threshold is determined to be at the level of the last position of the hearing loss attenuator, i.e., at the level of the last tone presented to the patient.

The AND gate 762 is connected to detect the pattern "I hear, I don't hear, I don't hear, I hear." For this pattern, the patient's threshold is determined to be at a level 5 db lower than the last position of the hearing loss attenuator. If this pattern is detected, the AND gate 762 is turned on to pass a pulse through the differentiator 774 which triggers the single shot multivibrator 776 at the end of the score period. Advantageously, in this illustrative embodiment of the invention, the single shot multivibrator 776 is adapted to remain on for a period of 200 microseconds after it has been triggered. The AND gate 764, in the pattern detection circuitry, is connected to detect the pattern "I don't hear, I hear, I hear, I don't hear." For this pattern, the patient's threshold is determined to be at a level of 5 db higher than the last position of the hearing loss attenuator. If this pattern is detected, the AND gate 764 is turned on to pass a pulse through the differentiator 778 to trigger the single shot multivibrator 780. As above, in this illustrative embodiment of the invention, the single shot multivibrator 780 is adapted to be triggered at the end of the score period and to remain on for 200 microseconds.

As shown in FIGURE 8, the output of the pattern detector AND gate 760, as well as the outputs of the single shot multivibrators 776 and 780, are connected to an OR gate 768. In addition, the OR gate 768 has an input from the AND gate 740 at the output of the binary counter. As such, it will be appreciated by those skilled in the art that if any pattern is detected by the pattern detectors 760, 762, or 764, or if no pattern is detected, after seven score periods following the patient's change of response, the single shot multivibrator 772 will be triggered by a pulse provided at the output of the OR gate 768 and the differentiator 770. In this illustrative embodiment of the invention, the single shot multivibrator 772 is adapted to remain on for a period of 100 microseconds after it has been thus triggered.

The output 322, connected to the single shot multivibrator 772, when turned on by the latter, serves to terminate the threshold termination period and instructs the main routine control 36 to go to its next step. The output 402, connected to the zero output of the single shot multivibrator 776, serves at the end of its zero state to cause the binary number in the reference register 56 to be reduced by one. The output 404, connected to the zero output of the single shot multivibrator 780, serves at the end of its zero state to cause the number in the reference regiser 56 to be increased by one.

Figure 10:
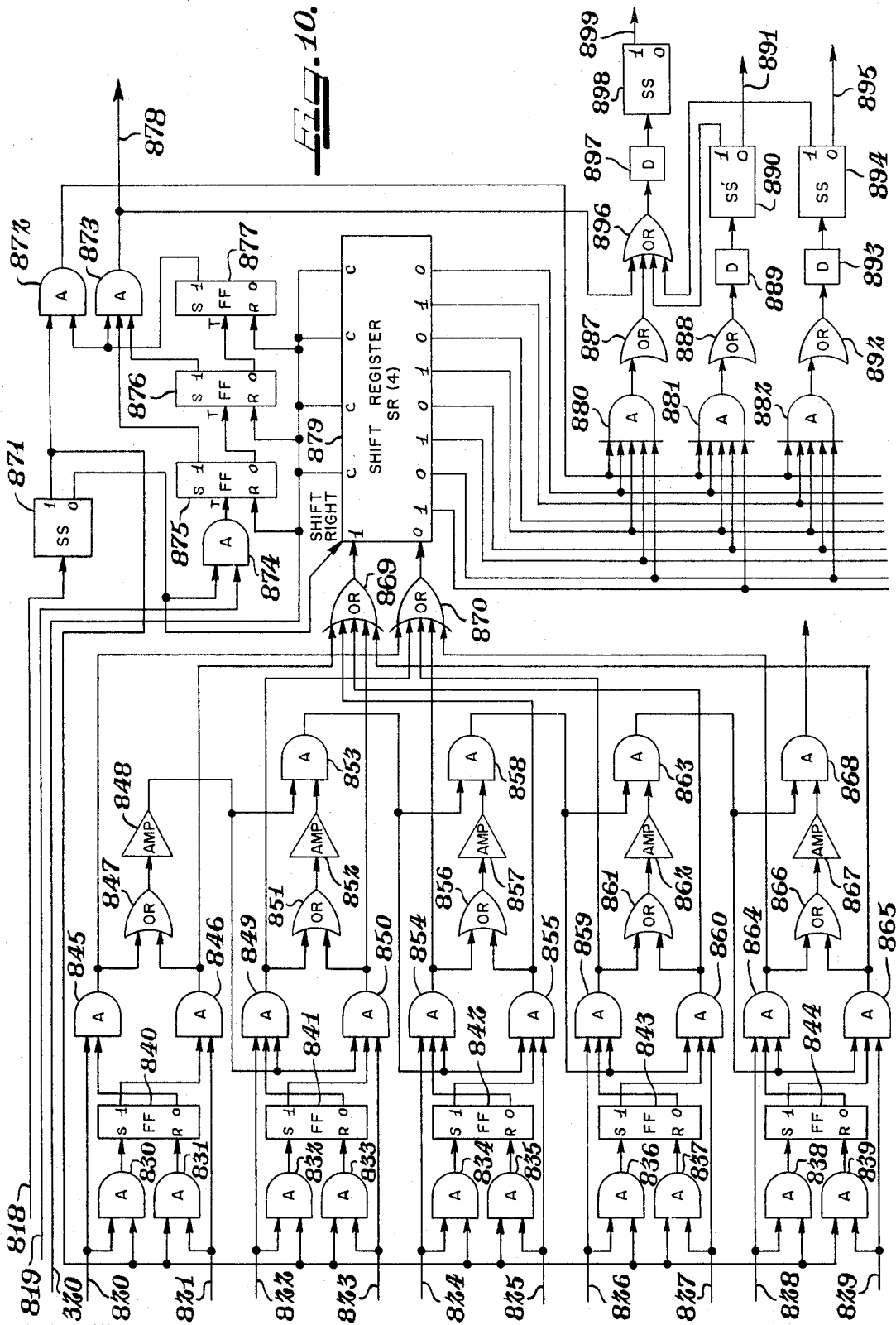
FIGURE 10 is a logic diagram of an alternative illustrative embodiment of pattern recogniton circuit which may be incorporated in the automatic audiometer of the invention.

FIGURE 10 of the drawing discloses an alternative form of a pattern recognition circuit which advantageously may be utilized in the inventive tester combination in lieu of the pattern recognition circuit immediately described above. In the logic diagram of FIGURE 10, there is disclosed a circuit, which instead of examining the subject's responses directly, examines the sequence of attenuator settings, determined by the subject's responses, to detect patterns of movement from which the subjects threshold can be determined. This type of pattern detector, which examines patterns in the sequence of stimulus conditions as determined by the subject's responses also can be used with various types of physiological testing apparatus.

Referring now specifically to the alternative pattern recognition circuit of FIGURE 10, its operation now will be described. Basically, it will be seen that this circuit detects patterns in a sequence of attenuator settings by comparing each setting with the previous setting to deermine if it is higher or lower, then storing this information in a shift register, and detecting patterns in the time sequence of relative settings.

Input 818 turns on whenever the audiometer attenuator reaches a new setting. This triggers the single shot multivibrator 871, which remains on for 100μ seconds. The sequence of events is that at the beginning of the 100μ second period, the results of the comparison network are shifted into shift register 879. During the 100μ second period, the pattern detector circuits are activated and the attenuator setting is stored in a register to serve as a reference for the next comparison.

Inputs 820 through 829 come from the position register 52 in the position finding circuit. Inputs 820, 822, 824, 826 and 828 give the position number from most significant digit to least significant digit of whichever coding wheel is connected to the position register at the time. Inputs 821, 823, 825, 827 and 829 give the complement of this position number. The AND gates 830 through 839 cause this number to be loaded into the register consisting of flip-flops 840 through 844 whenever the single shot multivibrator 871 is on. The comparison network, consisting of elements 845 through 870, continuously compares the number from the position register with the number in register 840–844 to determine which is greater. The OR gate 869 is on if the number from the position register is less than the number in the register 840–844. The OR gate 870 is on if the number from the position register is greater than the number in the register 840–844. If both numbers are the same, the output of AND gate 868 is on.

The results of the comparison are shifted into the four stage shift register 879 each time the single shot multivibrator 871 turns on. Thus, the results of the last four comparisons are stored in the shift register 879.

Input 819 is on when the increment control has selected 5 db increments for the attenuator movement. After input 819 turns on, the counter circuit, consisting of flip-flop 875, 876 and 877, counts up one at the end of each 100μ second pulse from the single shot multivibrator 871. After the counter has counted up to four, the pattern detector circuits are activated during each 100μ second pulse from single shot multivibrator 871.

The AND gates 880, 881, and 882 are three of a number of possible pattern detection gates. AND gate 880 detects the following sequence of attenuator movements:

—higher intensity (up), lower (down), lower (down), higher up—

When this pattern is detected, the single shot multivibrator 898 is turned on for 100μ seconds. Output 899, when on, ends the threshold determination period and instructs the main routine control 36 to go on to its next step.

AND gate 881 detects the following sequence of attenuator movements:

—higher intensity (up), lower (down), higher (up), lower (down)—

When this pattern is detected, single shot multivibrator 890 is triggered on for 200μ seconds, and in turn triggers on single shot multivibrator 898 to end the threshold determination period. Output 891, at the end of its zero state, causes the number in the reference register 56 to be increased by one.

AND gate 882 detects the following sequence of attenuator movements:

—lower (down), lower (down), higher (up), higher (up)—

When this pattern is detected, single shot multivibrator 894 is triggered on for 200μ seconds and in turn, triggers on single shot multivibrator 898 to end the threshold determination period. Output 895, at the end of its zero state, causes the number in the reference register 56 to be reduced by one.

AND gate 873 turns on after the counter 875–877 has counted up to seven. Thus, if no pattern is detected after seven 5 db increments, single shot multivibrator 898 is triggered on to end the threshold determination period. Output 878, when on, indicates to the character selector 98 that no acceptable pattern has been found.

Input 320 is off only during the threshold determination period. It resets counter 875–877 and shift register 879 at the end of the threshold determination period.

It will be clear to those skilled in the art that the above-described embodiment of pattern recognition circuit, as shown in FIGURE 10, is merely illustrative and that it can be adapted to recognize patterns of a greater or lesser number than four elements, if desired.

It further will be appreciated that other embodiments of pattern recognition circuitry may be utilized in combination with a physiological testing apparatus. One contemplated embodiment would serve to examine the sequence of stimulus conditions presented to a subject by the testing apparatus wherein the sequence would be determined by the responses of the subject, and the pattern recognition circuitry would recognize patterns of identical stimulus conditions in the sequence thereby providing information as to the subject physiological state. Another contemplated embodiment would serve to recognize patterns in the statistical distribution of the stimulus conditions at which the subject responds, and thereby provide information as to the subject's physiological state.

*Hearing loss increment control*

FIGURE 9 of the drawing is a logic diagram of the hearing loss increment control 90 which forms a part of the threshold determination circuit 26. As there shown, the input 320 is connected to the reset terminals on the flip-flops 790 and 800, respectively. In the operation of the audiometer, the input 320 assumes the state zero only during the threshold determination period. Thus, at the beginning of the threshold determination period, the flip-flop 790 and 800 are turned off.

The input 730 is connected to the output of the pattern recognition circuit and is turned on or assumes state one at the end of a score period, if during that score period, the patient changed his type of response from "I don't hear" to "I hear." In a similar manner, input 732 is connected to the output of the pattern recognition circuit 86 and is turned on or assumes state one at the end of a score period if, during that score period, the patient changed his type of response from "I hear" to "I don't hear."

Inputs 730 and 732 are respectively connected through the differentiators 792 and 794 to the OR gate 796. Thus, a pulse is produced at the output of the OR gate 796 at the end of any score period during which the patient response differs from his response during the previous score period. The purpose of the flip-flop 790 and the AND gate 798, connected to the output of flip-flop 790 and the OR gate 796, is to eliminate an anomaly which occurs after the first score period due to the fact that there is not yet a previous response by the patient. At the end of the first score period, the flip-flop 790 is still off so that any pulse appearing at the output of the OR gate 796 cannot pass through the AND gate 798. Thus, the flip-flop 800 connected to the output of the AND gate 798 remains off.

The input 724 is connected through the differentiator 810 to an input of each of the AND gates 802 and 804. The other inputs to these AND gates are derived respectively from the state one output and the state zero output of the flip-flop 800. The input 724 assumes the state zero only during the score period. Thus, a pulse is produced at the output of the differentiator 810 at the end of each score period, which pulse is applied to both of the AND gates 802 and 804. At the end of the first score period, the other input to the AND gate 802 is off while the other input to the AND gate 804 is on, so that the pulse appears at the output of the AND gate 804 only. This pulse triggers the single shot multivibrator 808, which in this illustrative embodiment remains on for a period of two seconds. The output 788 from the single shot multivibrator 808, while in the state one for two seconds, turns on the audiometer hearing loss drive control 72, causing the hearing loss attenuator to move 10 db. Also, at the beginning of this two second period, the flip-flop 790 is turned on by the action of the single shot multivibrator 808, and the flip-flop 790 remains on until the end of the threshold determination period.

When the patient changes his response, the pulse from the OR gate 796 can pass through the AND gate 798 and turn on the flip-flop 800. This flip-flop remains on until the end of the threshold determination period. It now will be appreciated that the state of the input to the AND gates 802 and 804 is now reversed, from that described above, so that at the end of a score period, the single shot multivibrator 806 is triggered instead of the single shot multivibrator 808. The output 786, connected to the single shot multivibrator 806, is turned on or placed in the state one for one second and turns on the audiometer hearing loss drive control 72 to cause the hearing loss attenuator to move 5 db.

Thus, it will be understood, that until the patient changes his type of response, the hearing loss attenuator moves in 10 db increments. After the patient changes his type of response, it moves in smaller or finer increments of 5 db until threshold is determined.

*Pattern detector programming*

FIGURE 11 of the drawing discloses one illustrative embodiment of pattern detector programming means for enabling the operator of the apparatus to preselect the patterns to be detected automatically during the testing operation. This circuitry and its operation now will be described with reference to FIGURE 11 so that it can be fully understood.

Inputs 901 through 908 come from the pattern storage register 758 or 879. The inputs 901, 903, 905, and 907 represent the last four elements in the pattern, with the input 901 being the last. The inputs 902, 904, 906 and 908 are complementary to inputs 901, 903, 905 and 907.

Switches 910 through 933 have three positions: an up position to specify that an element in desired pattern must be present; a center position to specify that an element may be either present or absent; and a down position to specify that an element must be absent. Each row of four switches is used to specify one pattern in this particular embodiment of the invention.

The AND gates 934 through 939 detect the specified patterns and are equivalent to the AND gates 760, 762 and 764 in the pattern recognition circuit, FIGURE 8, or to the AND gates 800, 881, and 882 in the alternate pattern recognition circuit, FIGURE 10. Input 909 activates the pattern detector gates. Each of switches 940 through 945 is used to specify, for the pattern selected by the switches in its row, where the threshold level should be relative to the final position of the attenuator. The up position indicates that the threshold is 5 db higher than the final attenuator position; the center position indicates that the threshold is the same as the final attenuator position, and the down position indicates that the threshold is 5 db lower.

OR gates 946, 947 and 948 combine the output leads of switches 940 through 945 into the three output leads 949 through 951. Output 949 is equivalent to the output of AND gate 764, in FIGURE 8, and causes the number in the reference register 56 to be increased by one. Output 950 is equivalent to the output of AND gate 760 in FIGURE 8 and causes the number in the reference register to remain unchanged. Output 951 is equivalent to the output of AND gate 762 and causes the number in the reference register to be reduced by one.

Manifestly, as will be appreciated by those skilled in the art, the circuit of FIGURE 11 is merely exemplary. As such, it will be understood that such circuits may utilize more or less than six patterns, as desired, and that each pattern may have more or less than four elements.

*Variable score period*

FIGURE 12 of the drawing discloses one illustrative embodiment of a circuit suitable for varying the score period of the testing apparatus. This logic circuit is of course merely exemplary, and its components and operation now will be described so that its function in the invention can be fully understood.

Single shot multivibrators 972, 977 and 982 have durations of two seconds, three seconds, and four seconds, respectively. One of these is selected, based on the patient's response time on the first pulsed tone presented to him, to define the score period for the remainder of testing.

Input 218 turns on flip-flop 962 after the 10 db increment which occurs at the end of the initial threshold approach at 1,000 cycles per second. Input 240 is connected to the patient response button and turns off flip-flop 962 when the patient responds to the first tone presented after input 218 turns on. Input 959 is on during the one second tone interval. Input 960 is the complement of input 959 and is off during the one second tone interval.

Both inputs to each of the AND gates 969, 974 and 979 turn on when the first tone is presented, turning on all three score period single shot multivibrators.

If the patient's first response occurs during the one second interval of this first tone, all three inputs to AND gate 964 will be on, turning on flip-flop 965. Flip-flop 965 will then remain on for the duration of testing, causing AND gate 968 to turn on the two second score period single shot multivibrator 972 each time the tone is turned on.

If the patient's first response occurs within one second after the tone interval, all four inputs to AND gate 966 will be on, turning on flip-flop 967. Flip-flop 967 will then remain on for the duration of testing, causing AND gate 973 to turn on the three second score period single shot multivibrator 977 each time the tone is turned on.

If the patient's first response occurs later than one second after the end of the tone interval, neither of the flip-flops 965 and 967 will be turned on, causing AND gate 978 to turn on the four second score period single shot multivibrator 982 each time the tone is turned on. OR gate 982 combines the outputs of single shot multivibrators 972, 977 and 982 into a single score period output. Input 194 rests flip-flops 962, 965 and 967 at the end of testing.

*Typical operation of the automatic audiometer*

Now that the overall construction and operation of the inventive automatic audiometer have been described, and the construction and operation of its important particular components have been disclosed in detail, the operation of the automatic audiometer can be best illustrated by considering a particular typical example. For this example, it will be assumed that it is desired to test the patient's right ear at the frequencies, 125, 250, 500, 1000, 2000, 4,000, and 8,000 cycles per second, in that order. Towards this end, the frequency programming panel 38 would be programmed by inserting the proper plugs in the selected telephone jacks in the manner described hereinabove, and the right-left ear switch 94 would be set on "right."

The patient is seated in such a way that he cannot see the control panel of the audiometer. He is given the patient response button 25 and is instructed to depress it when he hears a tone. The earphones are placed on his head and the start button 30 is actuated to start the test.

Assuming that the row selector switch 40 is not in the starting or "HOME" position, the pretest routine control 34 will cause the row selector switch wipers to be stopped until they reach "HOME" position. The binary number for the one thousand cycles per second frequency then is placed into the reference register 56 by the pretest routine control 34, which then instructs the main routine control 36 to cause the audiometer frequency drive 68 and the printer frequency drive 70 to be brought to the corresponding one thusand cycles per second position. This is accomplished in the following manner.

The input selector 50 in the position finding circuitry 24 is connected to the appropriate input, in this case, the digital position binary coded disc 42 for the audiometer frequency position. The output selector 66 in the position finding circuitry is connected to the corresponding output, in this case, the audiometer frequency drive 68. The position register 52 now cotnains the binary number for the present frequency setting of the audiometer frequency dial. The reference register 56 contains the binary number for the desired position of the audiometer frequency dial, in this case, one thousand cycles per second.

The direction determination circuit 58 compares the number in the position register 52 with the number in the reference register 56 to determine if it is larger or smaller, and instructs the output direction control 62 whether to select the forward or reverse direction. The output on-off control 64 turns on the selected output drive, in this case, the audiometer frequency drive 68. The coincidence detector 60 compares the changing number in the position register 62 with the desired number in the reference register 56, and when the two numbers are found to be the same, the output on-off control 64 is turned off and the frequency dial stops at the desired frequency. When this occurs, the main routine control 36 is instructed to go on to the next step, which in this case, is to follow the same procedure for the positioning of the printer frequency drive 70. Thus, both the audiometer and the printer are brought to the one thousand cycles per second position.

The pretest routine control 34 then places the binary number for −10 db into the reference register 56, and the main routine control 36 again follows the position finding procedure described above to bring the audiometer bearing loss attenuator 74 to the −10 db position. The pretest routine control 34 then instructs the tone switch drive 92 to turn on the tone and instructs the audiometer hearing loss drive control 72 to cause the hearing loss drive 74 to rotate clockwise, or towards higher tone levels. Thus, the one thousand cycles per second tone is turned on at its lowest level and is gradually increased in intensity at the rate of 5 db per second.

When the patient responds to the tone, as for example, at a 25 db hearing loss, by depressing the patient response button 25, the pretest routine control 34 immediately causes the tone to be turned off, but allows the audiometer hearing loss drive 74 to continue its rotation for two additional seconds. The hearing loss attenuator then stops at a level 10 higher than the level at which the patient responded; in this case, at 35 db.

The pretest routine control 34 once again places the binary number for one thousand cycles per second into the reference register 56 and instructs the main routine control 36 to follow the procedure described above for bringing the audiometer frequency drive 68 and the printer frequency drive into the 1000 cycles per second position, thus checking the previously established position.

At this point, the pretest routine control 34 instructs the main routine control 36 to assume control for the remainder of the testing period, beginning with a threshold determination and print out at one thousand cycles per second. The main routine control 36 initiates the sequence of events leading to a threshold determination by causing the intertone period control 80 to produce a one second delay. At the end of this delay interval, the tone period control 82 is turned on for a one second period, simultaneously turning on the score period control 84 for a four second period. The tone period control 82 also causes the tone switch drive 92 to turn on the tone during the one second tone period. In the present example, the tone is presented to the patient at the previously established 35 db level.

Assume that the patient's response at this level occurs one and one-half seconds after the beginning of the one second tone period. On the basis of this response time, a three second score period is selected and will be used for the duration of the test. At the same time the pattern recognition circuit 86 recognizes the patient's response at this level as an "I hear" response, and at the end of the score period places this information in a register 758 which stores the patient's last four responses. The hearing loss increment control 90, through the audiometer hearing loss drive control 72, causes the hearing loss attenuator 74 to be moved by 10 db. The hearing loss direction control 88, since the patient has responded to the last tone, instructs the hearing loss drive control 72 to cause the hearing loss attenuator 74 to be moved in the direction of decreasing tone intensity.

When the audiometer hearing loss attenuator 74 has reached its new position of 25 db, the intertone period control 80 causes a delay of zero, one, or two seconds, depending on its built-in programming. At the end of this interval, the tone period control 82 is once again turned on for its one second period and the score period control 84 is turned on for its three second period. The tone again is turned on during the tone period, but this time at 25 db.

Assume that the patient again responds during the score period. At the end of the score period, the pattern recognition circuit 86 stores this response in the response storage shift register 758, the hearing loss increment control 90 causes the hearing loss attenuator 74 to move again in a 10 db increment, and the hearing loss direction control 88 causes it to move in the direction of decreasing intensity. When the hearing loss attenuator 74 reaches its new position of 15 db, the intertone period control causes another zero, one, or two second delay, and then the tone is presented to the patient at the level of 15 db.

Assume that the patient does not respond at this level. The pattern recognition circuit 86 senses that the patient has changed the type of response from "I hear" to "I don't hear" and instructs the hearing loss increment control 90 to select 5 db increments until the end of the threshold determination period. The hearing loss increment control 90 causes the hearing loss attenuator 74 to move 5 db and the hearing loss direction control 88 causes it to move in the direction of increasing intensity since the patient has not responded to the last tone. At the beginning of this increment, the binary counter in the pattern recognition circuit 86, which counts the number of score period endings following the patient's change of response, counts this as the first score period ending. When the hearing loss attenuator 74 reaches its new position of 20 db, after another delay, the tone is presented to the patient at the 20 db level.

Assume that the patient responds to the tone at this new 20 db level. The hearing loss attenuator 74 moves 5 db to the 15 db level. Assume that when the tone is presented to the patient at this level, the patient does not respond. The hearing loss attenuator 74 when moves 5 db back to the 20 db level. Assume that the patient responds at this level. At the end of the score period, the counter in the pattern recognition circuit 86 counts this as the fourth score period following the patient's change of response and allows the pattern detectors 760, 762 and 764 in the pattern recognition circuit 86 to function. As explained hereinabove, there are a number of such pattern detectors, each one examining the four latest patient responses stored in the response storage shift register 758 of the pattern recognition circuit, to see if a pattern has developed which indicates that the threshold has been determined.

As set forth in detail in the description of the pattern recognition circuit hereinabove, each pattern detector is adapted to recognize a particular type of pattern built into the apparatus. In this case, the patient's response pattern was "I don't hear," "I hear," "I don't hear," and "I hear," indicating that the patients threshold was at the level of his last response. The particular pattern detector for this recognized pattern then functions and instructs the main routine control 36 to terminate the threshold determination period.

The input selector 50 has been connected to the digital position binary coded disc 46 for the audiometer hearing loss position during the threshold determination period, and so the position register 52 now contains the binary number for 20 db. The main routine control 36 then instructs the transfer circuit 54 to transfer this number from the position register 52 to the reference register 56. The input selector 50 then is instructed to select the digital position binary coded disc 48 for the printer hearing loss position. The position finding sequence of operation previously described is again followed, to bring the printer hearing loss drive 76 to the 20 db position.

The main routine control 36 then instructs the print out control 96 to cause the character selected by the character selector 98 to be printed out on the audiogram card. This character is selected on the basis of information from the right ear-left ear switch 94 and from the pattern recognition circuit 86. If a typewriter is used as the printer, having a different color ribbon identified with each ear, then the color of the character print out is selected by the color selector drive 100 using information from the right ear-left ear switch 94. In this case, for example, a red zero may be printed out on the audiogram card at the 20 db and one thousand cycles per second position. While the printer for purposes of illustration has been disclosed herein as a typewriter, those skilled in the art will readily appreciate the various other types of output printing mechanisms may be used at the output of the automatic audiometer in addition to the typewriter shown in FIGURE 1 of the drawing. Since the details of the printing mechanism, as such, do not form a part of this invention, the specific typewriter details and controls therefor have not been disclosed herein. It is therefore, sufficient to show the mechanism for printing on the audiogram card in the illustrative block diagram form of FIGURE 2 of the drawing.

In the next step of the test, the main routine control 36 instructs the row selector switch 40 to step once, causing the switch wiper arms to move to the next contact position for selecting the number in the first row of the frequency programming panel 38, which in this case, comprises the binary code number for 125 cycles per second. The input selector 50 causes this binary number to be placed in the position register 52. The transfer circuit 54, on command from the main routine control 36, transfers this number into the reference register 56. The procedure previously described is followed, bringing the audiometer and the printer to the 125 cycles per second position.

The main routine control 36 now initiates another threshold determination sequence, in the same manner as with the previous frequency tone. The following patient response pattern will be assumed to illustrate this particular sequence. The patient indicates "I hear" at the 20 db level at which the hearing loss attenuator 74 was left after the previous test. The attenuator moves down 10 db to the 10 db level and the patient indicates "I don't hear." The attenuator then moves up 5 db to the 15 db level, and the patient indicates "I hear." The attenuator then moves down 5 db to the 10 db level and the patient again indicates "I hear." The attenuator then moves down 5 db to the 5 db level, and the patient indicates at this time "I don't hear." At this point, there have been four score period endings following the patient's change of response and the pattern detectors in the pattern recognition circuit 86 are allowed to function. The patient's last four responses were "I don't hear," "I hear," "I hear," and "I don't hear," indicating a threshold level at 5 db higher than the level of the last tone presentation. In this case, the patients threshold would be at the 10 db level, at which the patient responded at least fifty percent of the time.

The pattern detector for the above pattern functions, and terminates the threshold determination period. The binary number for the position of the hearing loss attenuator 74 is transferred from the position register 52 to the reference register 56. The pattern recognition circuit 86 causes the number in the reference register 56 to be increased by one, corresponding to the fact that the patient's threshold is 5 db greater than the last position of the hearing loss attenuator. The input selector 50 and the output selector 66 now select the printer hearing loss position and the position finding sequence is followed to bring the printer to the 10 db position. In the use of a printing typewriter having a two color ribbon, a red zero is printed at this position on the audiogram card.

At this time, the row selector 40 again steps the wiper arms to the next contact position to select the binary coded number in the second row of the frequency programming panel 38. In this case, this will be the binary number for the frequency of 250 cycles per second. In the manner described above, the audiometer and the printer are brought to the 250 cycles per second position.

Assume that during the threshold determination procedure at 250 cycles per second, the patient responds by depressing the patient response button 25 at times outside of the three second score period. The pattern recognition circuit 86 counts an error at the end of each non-score period during which a patient responds. The pattern detectors in the pattern recognition circuit 86 are not allowed to function if the patient has made an error during any one of the latest three non-score periods.

Assume that in the present illustrative example, this condition prevails during the entire testing at the 250 cycles per second frequency tone. In such case, the tone will be presented, based on the patient's responses during the score periods, for seven times following the patient's first change of response. At the end of such seven times, the threshold determination period will be terminated by the action of the binary counter in the pattern recognition circuits and during print out, a red question mark will be printed by the typewriter at the level of the last position of the hearing loss attenuator. This indicates that a threshold could not be accurately determined because of too many patient errors.

The audiometer continues on in the same manner for each of the remaining programmed frequencies 500, 1,000, 2,000, 4,000 and 8,000 cycles per second, of this illustrative example. In each case, the typewriter will print out the proper character at the proper position on the audiogram card. When the stop command programmed into the frequency programming panel 38 is reached by the row selector switch, the automatic audiometer operation stops and thus completes the testing for that ear. The machine then is in condition for testing of the patient's other ear by switching the right ear-left ear switch 94 to the left ear position and once again initiating the testing sequence.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of automatically operable testing apparatus comprising the combination of means for applying to a subject a series of controlled stimuli in which one stimulus parameter is varied, response means for allowing the subject to indicate his response to said stimuli, pattern detector means connecting to said response means for detecting and correlating the occurrence of any one of a number of predetermined patterns in the sequence of subject responses, and evaluation means connected to said pattern detector means to derive from a detected response pattern a value representing one aspect of the subject's physiological condition.

2. Automatically operable testing apparatus in accordance with claim 1 wherein said pattern detector means comprises memory and logic circuits.

3. Automatically operable testing apparatus in accordance with claim 2 further comprising selectively adjustable programming means connected to said pattern detector means for predetermining the subject response patterns to be detected.

4. The improvement of an automatic audiometer for automatically testing and indicating the hearing loss characteristics of a subject comprising the combination of means for applying a signal at a series of intensity levels to the ears of a subject, response means for allowing the subject to indicate his response to said signal, pattern detector means connected to said response means for detecting and indicating the occurrence of any one of a number of predetermined patterns in the sequence of subject responses, and evaluation means connected to said pattern detector means for deriving the subject's hearing threshold from a detected response pattern.

5. An automatic audiometer in accordance with claim 4 wherein said pattern detector means comprises memory and logic circuits.

6. An automatic audiometer in accordance with claim 5 which further comprises selectively adjustable programming means connected to said pattern detector means for predetermining the subject response patterns to be detected.

7. The improvement of an automatic audiometer for automatically testing and indicating the hearing loss characteristics of a subject comprising the combination of an audio signal generator capable of providing a signal at a plurality of different frequencies, an attenuator connected to said audio signal generator and operable to provide a plurality of different signal intensity levels, transducer means connected to the output of the attenuator to apply the signal to the ears of the subject response means for allowing the subject to indicate his response to said signal, pattern detector means connected to said response means to indicate the occurrence of any one of a number of predetermined patterns in the sequence of subject responses, and evaluation means connected to said pattern detector means for deriving the subject's hearing threshold from a detected response pattern.

8. An automatic audiometer in accordance with claim 7 wherein said pattern detector means comprises memory and logic circuits.

9. An automatic audiometer in accordance with claim 7 which further comprises selectively adjustable programming means connected to said pattern detector means for predetermining the subject response patterns to be detected.

10. The improvement of an automatic audiometer for automatically testing and indicating the hearing loss characteristics of a subject comprising the combination of an audio signal generator capable of providing a signal at a plurality of different frequencies, selectively adjustable programming means connected to said audio signal generator by which the frequencies at which a subject is to be tested and their order of occurrence can be selected prior to testing the subjects, a frequency selector switch, frequency selector switch drive control means for enabling said frequency selector switch to select automatically the frequency indicated by the programming means, an attenuator connected to said audio signal generator and operable to provide a plurality of different signal intensity levels, transducer means connected to the output of the attenuator, to apply the signal to the ears of the subject response means for allowing the subject to indicate his response to said signal.

11. An automatic audiometer in accordance with claim 10 which further comprises programming means connected to said audio signal generator for providing a pretest at a selected signal frequency which can be automatically repeated during subsequent testing, said pretest providing a test-retest reliability check of the subject's hearing threshold at said selected frequency.

12. The improvement of an automatic audiometer for automatically testing and indicating the hearing loss characteristics of a subject comprising the combination of an audio signal generator capable of providing a signal at a plurality of different frequencies, switching means connected to said audio signal generator for providing intermittent signal pulses, an attenuator connected to said audio signal generator and operable to provide a plurality of different signal intensity levels, attenuator drive control means for causing the attenuator to select automatically the desired attenuator setting, drive means for automatically changing the setting of said attenuator, transducer means connected to the output of the attenuator, to apply the signal to the ears of the subject response means for allowing the subject to indicate his response to said signal, means connected to said response means for determining from the subject's responses whether the next signal should be presented at a greater or lesser intensity, means for determining from the subject's pattern of responses the magnitude of incremental change in intensity for the next signal to be presented.

13. The improvement of an automatic audiometer for automatically testing and indicating the hearing loss characteristics of a subject comprising the combination of an audio signal generator capable of providing a signal at a plurality of different frequencies, switching means connected to said audio signal generator for providing intermittent signal pulses an attenuator connected to said audio signal generator and operable to provide a plurality of different signal intensity levels, attenuator drive control means for causing the attenuator to select automatically the desired attenuator setting, drive means for automatically changing the setting of said attenuator, said attenuator drive control means comprising coincidence detection means for automatically making a comparison between the attenuator setting and the desired setting, and means for automatically changing the attenuator setting until a coincidence is detected by said coincidence detection means, transducer means connected to the output of the attenuator to apply the signal to the ears of the subject, and response means for allowing the subject to indicate his response to said signal.

14. An automatic audiometer in accordance with claim 13 wherein said attenuator drive control means further comprises direction determination means for controlling the direction of change of the attenuator setting in response to a comparison of the attenuator setting with a desired setting.

15. The improvement of an automatic audiometer for automatically testing and indicating the hearing loss characteristics of a subject comprising the combination of an audio signal generator capable of providing a signal at a plurality of different frequencies, selectively adjustable programming means connected to said audio signal generator by which the frequencies at which a subject is to be tested and their order of occurrence can be selected prior to testing the subject, a frequency selector switch, frequency selector switch drive control means for enabling said frequency selector switch to select automatically the frequency indicated by the programming means, said frequency selector switch drive control means comprising coincidence detection means for automatically making comparisons between the position of the frequency selector switch and a desired position, and means for changing the position of the frequency selector switch until coincidence is detected by said coincidence detection means, switching means connected to said audio signal generator for providing intermittent signal pulses, an attenuator connected to said audio signal generator and operable to provide a plurality of different signal intensity levels, and transducer means connected to the output of the attenuator to apply the signal to the ears of the subject, response means for allowing the subject to indicate his response to said signal.

16. An automatic audiometer in accordance with claim 15 wherein said frequency selector switch drive control means further comprises direction determination means for controlling the direction of change of the frequency selector switch in response to the comparisons of the position of the frequency selector switch with a desired position.

17. The improvement of an automatic audiometer for automatically testing and indicating the hearing loss characteristics of a subject comprising the combination of an audio signal generator capable of providing a signal at a plurality of different frequencies, switching means connected to said audio signal generator for providing intermittent signal pulses, an attenuator connected to said audio signal generator and operable to provide a plurality of different signal intensity levels, attenuator drive control means for causing the attenuator to select automatically the desired attenuator setting, drive means for automatically changing the setting of said attenuator, transducer means connected to the output of the attenuator, to apply the signal to the ears of the subject, response means for allowing the subject to indicate his responses to said signal, pattern detector means connected to said response means to indicate the occurrence of any one of a number of predetermined patterns in the sequence of subject responses, evaluation means connected to said pattern detector means for deriving the subject's hearing threshold from a detected response pattern and means for recording the subject's hearing loss for each frequency at which an acceptable response pattern is found.

18. An automatic audiometer in accordance with claim 17 wherein said evaluation means is further adapted to indicate when no acceptable response pattern is found within a predetermined maximum number of signal presentations.

19. An automatic audiometer in accordance with claim 18 wherein said evaluation means is further adapted to indicate when the subject has responded when no signal was presented more often than a predetermined maximum number of times.

20. The improvement of an automatic audiometer for automatically testing and indicating the hearing loss characteristics of a subject comprising the combination of an audio signal generator capable of providing a signal at a plurality of different frequencies, switching means connected to said audio signal generator for providing intermittent signal pulses, an attenuator connected to said audio signal generator and operable to provide a plurality of different signal intensity levels, transducer means connected to the output of the attenuator, to apply the signal to the ears of the subject, response means for allowing the subject to indicate his response to said signal, pattern detector means connected to said response means to indicate the occurrence of any one of a number of predetermined patterns in the sequence of subject responses, means connected to said pattern detector means for limiting the maximum number of signal presentations at any single frequency in the event that no acceptable subject response pattern is detected, and evaluation means connected to said pattern detection means for deriving the subject's hearing threshold from a detected response pattern.

21. The improvement of an automatic audiometer for automatically testing and indicating the hearing loss characteristics of a subject comprising the combination of an audio signal generator capable of providing a signal at a plurality of different frequencies, programming means connected to said audio signal generator for providing a pretest at a selected signal frequency which is automatically repeated during subsequent testing, said pretest providing a test-retest reliability check of the subject's hearing threshold at said selected frequency, switching means connected to said audio signal generator for providing intermittent signal pulses, an attenuator connected to said audio signal generator and operable to provide a plurality of different signal intensity levels, transducer means connected to the output of the attenuator to apply the signal to the ears of the subject, response means for allowing the subject to indicate his response to said signal, a scoring circuit connected to said response means for determining whether the subject has or has not heard a signal presented to the subject, means for adjusting the period of time after a signal has been presented during which a subject's response is considered valid, said time interval being determined by the subject's latency of response during the pretest.

22. The improvement of automatically operable testing apparatus comprising the combination of means for applying controlled stimuli to a subject, response means for allowing the subject to indicate his response to said stimuli, means for controlling one stimulus parameter as a predetermined function of the subject's responses, pattern detector means to indicate the occurrence of any one of a number of predetermined patterns in the sequence of responses to the stimulus conditions, and evaluation means connected to said pattern detector means to derive from a detected pattern a value representing one aspect of the subject's physiological condition.

23. The improvement of an automatic audiometer for automatically testing and indicating the hearing loss characteristics of a subject comprising the combination of an audio signal generator capable of providing a signal at a plurality of different frequencies, switching means connected to said audio signal generator for providing intermittent signal pulses, an attenuator connected to said audio signal generator and operable to provide a plurality of different signal intensity levels, transducer means connected to the output of the attenuator to apply the signal to the ears of the subject, response means for allowing the subject to indicate his response to said signal, attenuator drive control means for causing the attenuator to select automatically the desired attenuator setting on the basis of subject responses, pattern detector means connected to said attenuator drive control means to detect a number of predetermined patterns in the sequence of attenuator settings, and a threshold determination circuit connected to said pattern detector means for determining the subject's hearing threshold from a detected response pattern.

24. The improvement of an automatic audiometer for automatically testing and indicating the hearing loss characteristics of a subject comprising the combination of an audio signal generator capable of providing a signal at a plurality of different frequencies, selectively adjustable programming means connected to said audio signal generator by which the frequencies at which a subject is to be tested and their order of occurrence can be selected prior to testing the subjects, a frequency selector switch, frequency selector switch drive control means for enabling said frequency selector switch to select automatically frequency indicated by the programming means, an attenuator connected to said audio signal generator and operable to provide a plurality of different signal intensity levels, transducer means connected to the output of the attenuator, to apply the signal to the ears of the subject and response means for allowing the subject to indicate his response to said signal.

25. The improvement of an automatic audiometer for automatically testing and indicating the hearing loss characteristics of a subject comprising the combination of an audio signal generator capable of providing a signal at a plurality of different frequencies, switching means connected to said audio signal generator for providing intermittent signal pulses, an attenuator connected to said audio signal generator and operable to provide a plurality of different signal intensity levels, attenuator drive control means for causing the attenuator to select automatically the desired attenuator setting, drive means for automatically changing the setting of said attenuator, said attenuator drive control means comprising coincidence detection means for automatically making a comparison between the attenuator setting and the desired setting, and means for automatically changing the attenuator setting until a coincidence is detected by said coincidence detection means, transducer means connected to the output of the attenuator to apply the signal to the ears of the subject, and response means for allowing the subject to indicate his response to said signal.

26. The improvement of an automatic audiometer for automatically testing and indicating the hearing loss characteristics of a subject comprising the combination of an audio signal generator capable of providing a signal at a plurality of different frequencies, selectively adjustable programming means connected to said audio signal generator by which the frequencies at which a subject is to be tested and their order of occurrence can be selected prior to testing the subject, a frequency selector switch, frequency selector switch drive control means for enabling said frequency selector switch to select automatically the frequency indicated by the programming means, said frequency selector switch drive control means comprising coincidence detection means for automatically making comparisons between the position of the frequency selector switch and a desired position, and means for changing the position of the frequency selector switch until coincidence is detected by said coincidence detection means, switching means connected to said audio signal generator for providing intermittent signal pulses, an attenuator connected to said audio signal generator and operable to provide a plurality of different signal intensity levels, and transducer means connected to the output of the attenuator to apply the signal to the ears of the subject, response means for allowing the subject to indicate his response to said signal.

References Cited

UNITED STATES PATENTS

| | | | |
|---|---|---|---|
| 3,172,404 | 3/1965 | Copenhaver et al. | 128—76.5 |
| 3,237,711 | 3/1966 | Bates et al. | 179—1.7 |
| 2,781,416 | 2/1957 | Brogan | 179—1.7 |

KATHLEEN H. CLAFFY, *Primary Examiner.*

R. P. TAYLOR, *Assistant Examiner.*